(12) United States Patent
Zhu

(10) Patent No.: US 11,480,771 B2
(45) Date of Patent: Oct. 25, 2022

(54) CAMERA OPTICAL LENS INCLUDING SIX LENSES OF +-+-+- REFRACTIVE POWERS

(71) Applicant: AAC Optics Solutions Pte. Ltd., Singapore (SG)

(72) Inventor: Junyan Zhu, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 301 days.

(21) Appl. No.: 16/989,914

(22) Filed: Aug. 11, 2020

(65) Prior Publication Data

US 2021/0048640 A1 Feb. 18, 2021

(30) Foreign Application Priority Data

Aug. 16, 2019 (CN) .......................... 201910760678.2

(51) Int. Cl.
*G02B 13/00* (2006.01)
*G02B 9/64* (2006.01)
*G02B 13/18* (2006.01)

(52) U.S. Cl.
CPC ........... *G02B 13/0045* (2013.01); *G02B 9/64* (2013.01); *G02B 13/18* (2013.01)

(58) Field of Classification Search
CPC ....... G02B 13/0045; G02B 9/64; G02B 13/18
See application file for complete search history.

(56) References Cited

U.S. PATENT DOCUMENTS

2021/0011257 A1* 1/2021 Lyu .......................... G02B 9/62

* cited by examiner

*Primary Examiner* — Wen Huang
(74) *Attorney, Agent, or Firm* — W&G Law Group

(57) ABSTRACT

The present invention relates to the technical field of optical lens and discloses a camera optical lens satisfying following conditions: $-3.50 \leq f2/f \leq -1.50$, $6.50 \leq d1/d2 \leq 13.50$, $-0.20 \leq (R9+R10)/(R9-R10) \leq -0.05$, and $3.00 \leq R6/f \leq 10.00$; where f denotes a focal length of the camera optical lens, f2 a focal length of the second lens, d1 an on-axis thickness of the first lens, d2 an on-axis distance from an image-side surface of the first lens to an object-side surface of the second lens, R6 a curvature radius of an image-side surface of the third lens, R9 a curvature radius of an object-side surface of the fifth lens, and R10 a curvature radius of an image-side surface of the fifth lens. The camera optical lens in the present disclosure satisfies a design requirement of large aperture, ultra-thinness and wide angle while having good optical functions.

10 Claims, 11 Drawing Sheets

CAMERA OPTICAL LENS INCLUDING SIX LENSES OF +-+-+- REFRACTIVE POWERS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

Smart phones are developing and getting popularized fast, and development and design of cameras follow. As the current development trend of electronic products goes towards better functions and thinner and smaller dimensions, miniature camera lenses with good imaging quality is becoming a mainstream in the market.

In order to obtain better imaging quality, a mini-lens that is traditionally equipped in a mobile phone camera adopts a three-piece or four-piece and even five-piece or six-piece lens structure. Although a lens as such has good optical functions, the lens is fairly unreasonable in terms of setting of focal length, rendering that the lens structure with good optical functions can not satisfy a design requirement of large aperture, ultra-thinness and wide angle.

SUMMARY

To address the above issues, the present disclosure seeks to provide a camera optical lens that satisfies a design requirement of large aperture, ultra-thinness and wide angle while having good optical functions.

The technical solutions of the present disclosure are as follows:

A camera optical lens including, from an object side to an image side: a first lens having a positive refractive power; a second lens having a negative refractive power; a third lens having a refractive power; a fourth lens having a refractive power; a fifth lens having a positive refractive power; and a sixth lens having a negative refractive power; wherein the camera optical lens satisfies following conditions:

$-3.50 \leq f2/f \leq -1.50$;

$6.50 \leq d1/d2 \leq 13.50$;

$-0.20 \leq (R9+R10)/(R9-R10) \leq -0.05$; and $3.00 \leq R6/f \leq 10.00$;

where f denotes a focal length of the camera optical lens; f2 denotes a focal length of the second lens; d1 denotes an on-axis thickness of the first lens; d2 denotes an on-axis distance from an image-side surface of the first lens to an object-side surface of the second lens; R6 denotes a curvature radius of an image-side surface of the third lens; R9 denotes a curvature radius of an object-side surface of the fifth lens; and R10 denotes a curvature radius of an image-side surface of the fifth lens.

As an improvement, the camera optical lens further satisfies the following condition:

$-0.70 \leq f6/f \leq -0.55$;

where f6 denotes a focal length of the sixth lens.

As an improvement, the camera optical lens further satisfies the following condition:

$2.50 \leq R2/R1 \leq 4.50$;

where R1 denotes a curvature radius of an object-side surface of the first lens; and R2 denotes a curvature radius of an image-side surface of the first lens.

As an improvement, the camera optical lens further satisfies the following conditions:

$0.07 \leq d1/TTL \leq 0.23$;

$-0.67 \leq (R1+R2)/(R1-R2) \leq -1.05$; and $0.38 \leq f1/f \leq 1.41$;

where f1 denotes a focal length of the first lens; TTL denotes a total optical length from an object-side surface of the first lens to an image surface of the camera optical lens along an optical axis; R1 denotes a curvature radius of an object-side surface of the first lens; and R2 denotes a curvature radius of an image-side surface of the first lens.

As an improvement, the camera optical lens further satisfies the following conditions:

$0.02 \leq d3/TTL \leq 0.09$; and $0.76 \leq (R3+R4)/(R3-R4) \leq 7.33$;

where d3 denotes an on-axis thickness of the second lens; TTL denotes a total optical length from an object-side surface of the first lens to an image surface of the camera optical lens along an optical axis; R3 denotes a curvature radius of an object-side surface of the second lens; and R4 denotes a curvature radius of an image-side surface of the second lens.

As an improvement, the camera optical lens further satisfies the following conditions:

$0.03 \leq d5/TTL \leq 0.11$;

$-15.65 \leq (R5+R6)/(R5-R6) \leq -1.04$; and $2.39 \leq f3/f \leq 25.18$;

where f3 denotes a focal length of the third lens, d5 denotes an on-axis thickness of the third lens, TTL denotes a total optical length from an object-side surface of the first lens to an image surface of the camera optical lens along an optical axis, and R5 denotes a curvature radius of an object-side surface of the third lens.

As an improvement, the camera optical lens further satisfies the following conditions:

$0.03 \leq d7/TTL \leq 0.08$;

$1.61 \leq (R7+R8)/(R7-R8) \leq 22.33$; and $-74.05 \leq f4/f \leq -6.50$;

where f4 denotes a focal length of the fourth lens, d7 denotes an on-axis thickness of the fourth lens, TTL denotes a total optical length from an object-side surface of the first lens to an image surface of the camera optical lens along an optical axis, R7 denotes a curvature radius of an object-side surface of the fourth lens, and R8 denotes a curvature radius of an image-side surface of the fourth lens.

As an improvement, the camera optical lens further satisfies the following conditions:

$0.05 \leq d9/TTL \leq 0.16$; and $0.45 \leq f5/f \leq 1.67$;

where f5 denotes a focal length of the fifth lens, d9 denotes an on-axis thickness of the fifth lens, and TTL denotes a total optical length from an object-side surface of the first lens to an image surface of the camera optical lens along an optical axis.

As an improvement, the camera optical lens further satisfies the following conditions:

$$0.04 \leq d11/TTL \leq 0.12; \text{ and}$$

$$0.11 \leq (R11+R12)/(R11-R12) \leq 0.64;$$

where d11 denotes an on-axis thickness of the sixth lens, TTL denotes a total optical length from an object-side surface of the first lens to an image surface of the camera optical lens along an optical axis, R11 denotes a curvature radius of an object-side surface of the sixth lens, and R12 denotes a curvature radius of an image-side surface of the sixth lens.

As an improvement, the camera optical lens further satisfies the following condition:

$$FNO \leq 1.90;$$

where FNO denotes an F number of the camera optical lens.

The present disclosure is advantageous in: through the above lens configuration, the camera optical lens in the present disclosure has good optical functions and has characteristics of large aperture, wide angle and ultra-thinness, and is especially fit for WEB camera lenses and mobile phone camera lens assemblies composed by such camera elements as CCD and CMOS for high pixels.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
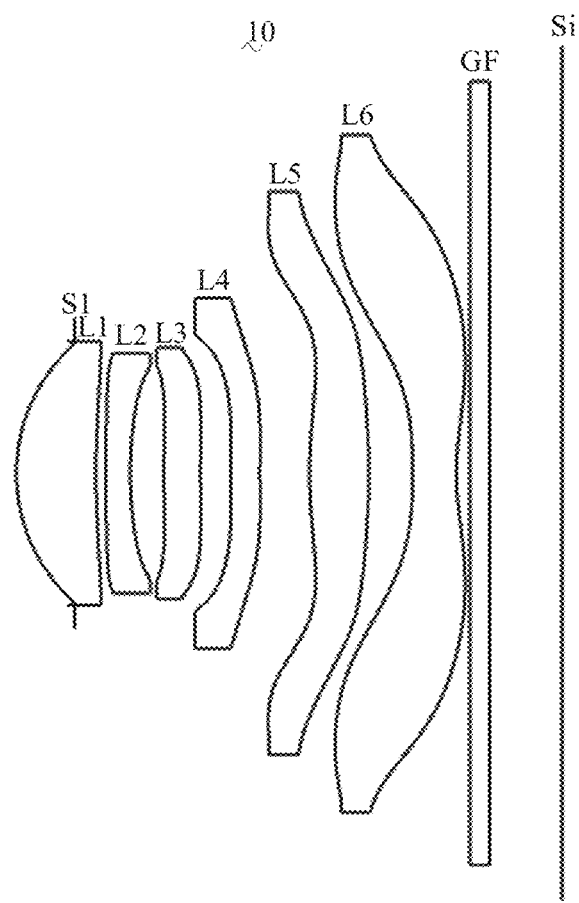
FIG. 1 is a schematic diagram of a structure of a camera optical lens according to Embodiment 1 of the present disclosure.

FIG. 1 shows the camera optical lens 10 of Embodiment 1 of the present disclosure, the camera optical lens 10 includes six lenses. Specifically, the camera optical lens 10 includes, from an object side to an image side: an aperture S1, a first lens L1, a second lens L2, a third lens L3, a fourth lens L4, a fifth lens L5 and a sixth lens L6. In this embodiment, an optical element such as an optical filter GF is arranged between the sixth lens L6 and an image surface Si. Herein, the optical filter GF may either be a glass cover plate or be an optical filter. Alternatively, the optical filter GF may further be arranged at another position in another embodiment.

In this embodiment, the first lens L1 has a positive refractive power, an object-side surface of the first lens L1 is convex and an image-side surface of the first lens L1 is concave; the second lens L2 has a negative refractive power, an object-side surface of the second lens L2 is convex and an image-side surface of the second lens L2 is concave; the third lens L3 has a positive refractive power, an object-side surface of the third lens L3 is convex and an image-side surface of the third lens L3 is concave; the fourth lens L4 has a negative refractive power, an object-side surface of the fourth lens L4 is convex and an image-side surface of the fourth lens L4 is concave; the fifth lens L5 has a positive refractive power, an object-side surface of the fifth lens L5 is convex and an image-side surface of the fifth lens L5 is convex; the sixth lens L6 has a negative refractive power, an object-side surface of the sixth lens L6 is concave and an image-side surface of the sixth lens L6 is concave.

Here, a focal length of the camera optical lens 10 is defined as f and a focal length unit is mm. A focal length of the second lens L2 is defined as f2, an on-axis thickness of the first lens L1 is defined as d1, an on-axis distance from the image-side surface of the first lens L1 to the object-side surface of the second lens L2 is defined as d2, a curvature radius of the image-side surface of the third lens L3 is defined as R6, a curvature radius of the object-side surface of the fifth lens L5 is defined as R9, a curvature radius of the image-side surface of the fifth lens L5 is defined as R10 and the camera optical lens 10 further satisfies the following conditions:

$$-3.50 \leq f2/f \leq -1.50 \quad (1)$$

$$6.50 \leq d1/d2 \leq 13.50 \quad (2)$$

$$-0.20 \leq (R9+R10)/(R9-R10) \leq -0.05 \quad (3)$$

$$3.00 \leq R6/f \leq 10.00 \quad (4)$$

Herein, condition (1) specifies a ratio between the focal length of the second lens L2 and the focal length of the camera optical lens 10, within a range of which a spherical aberration and a field curvature quantity of the camera optical lens can be effectively balanced.

Condition (2) specifies a ratio between the thickness of the first lens L1 and a space between the first lens L1 and the second lens L2, within a range of which it helps shortening a total optical length from the object-side surface of the first lens to an image surface of the camera optical lens 10 along an optical axis, thereby an ultra-thinness effect is realized.

Condition (3) specifies a shape of the fifth lens L5, beyond a range of which it is difficult to solve such a problem as an off-axis aberration with a development towards ultra-thin and wide-angle lens.

Condition (4) specifies a ratio between the curvature radius of the image-side surface of the third lens L3 and the focal length of the camera optical lens 10, within a range of which it helps improving functions of the camera optical lens 10.

In this embodiment, through a configuration of the lens as above, by using each of the lenses (L1, L2, L3, L4, L5 and L6) with different refractive powers, and by setting a ratio between the focal length of the second lens L2 and the focal length of the camera optical lens 10, a ratio between the thickness of the first lens L1 and a space between the first lens L1 and the second lens L2, a shape of the fifth lens L5 and a ratio between the curvature radius of the image-side surface of the third lens L3 and the focal length of the camera optical lens 10, it helps improving functions of the camera optical lens 10 and satisfies a design requirement of large aperture, ultra-thinness and wide angle.

Preferably, a focal length of the sixth lens L6 is defined as f6, and the camera optical lens 10 satisfies the following condition:

$$-0.70 \leq f6/f \leq -0.55 \quad (5)$$

Condition (5) specifies a ratio between the focal length of the sixth lens L6 and the focal length of the camera optical lens 10, through which and a reasonable distribution in focal length the camera optical lens 10 has better imaging quality and lower sensitivity.

Preferably, a curvature radius of the object-side surface of the first lens L1 is defined as R1, a curvature radius of the image-side surface of the first lens L1 is defined as R2, and the camera optical lens 10 satisfies the following condition:

$$2.50 \leq R2/R1 \leq 4.50 \quad (6)$$

Condition (6) specifies a shape of the first lens L1, within a range of which it helps soften refraction of light that passes through the lens, thereby effectively reducing aberration.

Preferably, a focal length of the first lens L1 is defined as f1, a total optical length from the object-side surface of the first lens L1 to the image surface Si of the camera optical lens 10 along an optical axis is defined as TTL, the curvature radius of the object-side surface of the first lens L1 is defined as R1, the curvature radius of the image-side surface of the first lens L1 is defined as R2, and the camera optical lens 10 satisfies the following conditions:

$$0.07 \leq d1/TTL \leq 0.23 \quad (7)$$

$$-4.67 \leq (R1+R2)/(R1-R2) \leq -1.05 \quad (8)$$

$$0.38 \leq f1/f \leq 1.41 \quad (9)$$

Condition (7) specifies a ratio between the on-axis thickness of the first lens L1 and the total optical length from the object-side surface of the first lens L1 to the image surface Si of the camera optical lens 10 along the optical axis, which facilitates realizing ultra-thinness.

Condition (8) specifies the shape of the first lens L1, within a range of which it enables the first lens L1 to effectively correct the spherical aberration of the camera optical lens.

Condition (9) specifies that the first lens L1 has an appropriate positive refractive power, within a range of which it helps reduce the aberration of the camera optical lens while facilitating the development towards ultra-thin and wide-angle lens.

Preferably, the focal length of the second lens L2 is defined as f2, an on-axis thickness of the second lens L2 is defined as d3, the total optical length from the object-side surface of the first lens L1 to the image surface Si of the camera optical lens 10 along the optical axis is defined as TTL, a curvature radius of the object-side surface of the second lens L2 is defined as R3, a curvature radius of the image-side surface of the second lens L2 is defined as R4, and the camera optical lens 10 satisfies the following conditions:

$$0.02 \leq d3/TTL \leq 0.09 \quad (10)$$

$$0.76 \leq (R3+R4)/(R3-R4) \leq 7.33 \quad (11)$$

Condition (10) specifies a ratio between the on-axis thickness of the second lens L2 and the total optical length from the object-side surface of the first lens L1 to the image surface Si of the camera optical lens 10 along the optical axis, which facilitates realizing ultra-thinness.

Condition (11) specifies a shape of the second lens L2, within a range of which it helps correct an on-axis aberration with the development towards ultra-thin and wide-angle lens.

Preferably, a focal length of the third lens L3 is defined as f3, an on-axis thickness of the third lens L3 is defined as d5, the total optical length from the object-side surface of the first lens L1 to the image surface Si of the camera optical lens 10 along the optical axis is defined as TTL, a curvature radius of the object-side surface of the third lens L3 is defined as R5, and the camera optical lens 10 satisfies the following conditions:

$$0.03 \leq d5/TTL \leq 0.11 \quad (12)$$

$$-15.65 \leq (R5+R6)/(R5-R6) \leq -1.04 \quad (13)$$

$$2.39 \leq f3/f \leq 25.18 \quad (14)$$

Condition (12) specifies a ratio between the on-axis thickness of the third lens L3 and the total optical length from the object-side surface of the first lens L1 to the image surface Si of the camera optical lens 10 along the optical axis, which facilitates realizing ultra-thinness.

Condition (13) specifies a shape of the third lens L3, within a range of which it helps soften refraction of light that passes through the lens, thereby effectively reducing aberration.

Condition (14) specifies a ratio between the focal length of the third lens L3 and the focal length of the camera optical lens 10, through which and a reasonable distribution in focal length the camera optical lens 10 has better imaging quality and lower sensitivity.

Preferably, a focal length of the fourth lens L4 is defined as f4, an on-axis thickness of the fourth lens L4 is defined as d7, the total optical length from the object-side surface of the first lens L1 to the image surface Si of the camera optical lens 10 along the optical axis is defined as TTL, a curvature radius of the object-side surface of the fourth lens L4 is defined as R7, a curvature radius of the image-side surface of the fourth lens L4 is defined as R8, and the camera optical lens 10 satisfies the following conditions:

$$0.03 \le d7/TTL \le 0.08 \quad (15)$$

$$1.61 \le (R7+R8)/(R7-R8) \le 22.33 \quad (16)$$

$$-74.05 \le f4/f \le -6.50 \quad (17)$$

Condition (15) specifies a ratio between the on-axis thickness of the fourth lens L4 and the total optical length from the object-side surface of the first lens L1 to the image surface Si of the camera optical lens 10 along the optical axis, which facilitates realizing ultra-thinness.

Condition (16) specifies a shape of the fourth lens L4, within a range of which it helps correct the off-axis aberration with the development towards ultra-thin and wide-angle lens.

Condition (17) specifies a ratio between the focal length of the fourth lens L4 and the focal length of the camera optical lens 10, within a range of which it helps improving functions of the camera optical lens 10.

Preferably, a focal length of the fifth lens L5 is defined as f5, an on-axis thickness of the fifth lens L5 is defined as d9, the total optical length from the object-side surface of the first lens L1 to the image surface Si of the camera optical lens 10 along the optical axis is defined as TTL, and the camera optical lens 10 satisfies the following conditions:

$$0.05 \le d9/TTL \le 0.16 \quad (18)$$

$$0.45 \le f5/f \le 1.67 \quad (19)$$

Condition (18) specifies a ratio between the on-axis thickness of the fifth lens L5 and the total optical length from the object-side surface of the first lens L1 to the image surface Si of the camera optical lens 10 along the optical axis, which facilitates realizing ultra-thinness.

Condition (19) specifies a ratio between the focal length of the fifth lens L5 and the focal length of the camera optical lens 10, which effectively makes a light angle of the camera optical lens 10 more even, thereby reducing tolerance sensitivity.

Preferably, an on-axis thickness of the sixth lens L6 is defined as d11, the total optical length from the object-side surface of the first lens L1 to the image surface Si of the camera optical lens 10 along the optical axis is defined as TTL, a curvature radius of the object-side surface of the sixth lens L6 is defined as R11, a curvature radius of the image-side surface of the sixth lens L6 is defined as R12, and the camera optical lens 10 satisfies the following conditions:

$$0.03 \le d11/TTL \le 0.08 \quad (20)$$

$$-11.91 \le (R11+R12)/(R11-R12) \le -1.27 \quad (21)$$

Condition (20) specifies a ratio between the on-axis thickness of the sixth lens L6 and the total optical length from the object-side surface of the first lens L1 to the image surface Si of the camera optical lens 10 along the optical axis, which facilitates realizing ultra-thinness.

Condition (21) specifies a shape of the sixth lens L6, within a range of which it helps correct the off-axis aberration with the development towards ultra-thin and wide-angle lens.

Preferably, an F number of the camera optical lens 10 is FNO, which satisfies the following condition:

$$FNO \le 1.90 \quad (22)$$

Condition (22) specifies a range of the F number of the camera optical lens 10, so that the camera optical lens 10 has a large aperture and good imaging function. With such designs, the total optical length TTL of the camera optical lens 10 can be made as short as possible, thus the miniaturization characteristics can be maintained.

In this embodiment, an image height of the camera optical lens 10 is IH, and satisfies the following conditions: TTL/IH≤1.25 and FOV≥80, which satisfies the requirement of ultra-thinness and wide angle.

When the focal length of the camera optical lens 10, focal lengths and curvature radiuses of each lens satisfy the above conditions, the camera optical lens 10 may have good optical functions and may satisfy the design requirement of large aperture, wide angle and ultra-thinness. According to the characteristics of the camera optical lens 10, the camera optical lens 10 is especially fit for WEB camera lenses and mobile phone camera lens assemblies composed by such camera elements as CCD and CMOS for high pixels.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (a total optical length from the object-side surface of the first lens L1 to the image surface Si of the camera optical lens 10 along an optical axis) in mm.

Preferably, inflexion points and/or arrest points can be arranged on the object-side surface and/or the image-side surface of the lens, so as to satisfy the demand for high quality imaging. The description below can be referred for specific implementations.

FIG. 1 is a schematic diagram of a structure of the camera optical lens 10 according to Embodiment 1 of the present disclosure. The design data of the camera optical lens 10 in Embodiment 1 of the present disclosure are shown in the following.

Table 1 lists object-side and image-side curvature radiuses R, on-axis thicknesses of lenses, distance d between lenses, refraction indexes nd and abbe numbers vd of the first to sixth lenses L1 to L6 that forms the camera optical lens 10 in Embodiment 1 of the present disclosure. Table 2 lists conic coefficient k and aspheric surface coefficients of the camera optical lens 10. It shall be noted that in this embodiment, units of distance, radius and thickness are millimeter (mm).

TABLE 1

|    | R      | d     |        | nd   |        | vd   |
|----|--------|-------|--------|------|--------|------|
| S1 | ∞      | d0=   | −0.643 |      |        |      |
| R1 | 1.856  | d1=   | 0.873  | nd1  | 1.5450 | v1 55.81 |
| R2 | 8.352  | d2=   | 0.108  |      |        |      |
| R3 | 14.116 | d3=   | 0.270  | nd2  | 1.6700 | v2 19.39 |
| R4 | 4.195  | d4=   | 0.369  |      |        |      |
| R5 | 12.616 | d5=   | 0.403  | nd3  | 1.5843 | v3 28.25 |

TABLE 1-continued

| | R | d | | nd | vd |
|---|---|---|---|---|---|
| R6 | 16.314 | d6= | 0.331 | | |
| R7 | 16.867 | d7= | 0.320 | nd4 1.6153 | v4 25.94 |
| R8 | 14.744 | d8= | 0.545 | | |
| R9 | 5.486 | d9= | 0.652 | nd5 1.5450 | v5 55.81 |
| R10 | −6.064 | d10= | 0.480 | | |
| R11 | −6.868 | d11= | 0.480 | nd6 1.5450 | v6 55.81 |
| R12 | 2.754 | d12= | 0.150 | | |
| R13 | ∞ | d13= | 0.210 | ndg 1.5168 | vg 64.21 |
| R14 | ∞ | d14= | 0.799 | | |

In the table, meanings of various symbols will be described as follows.

R: curvature radius of an optical surface;

S1: aperture;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the sixth lens L6;

R12: curvature radius of the image-side surface of the sixth lens L6;

R13: curvature radius of an object-side surface of the optical filter GF;

R14: curvature radius of an image-side surface of the optical filter GF;

d: on-axis thickness of a lens or on-axis distance between neighboring lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the optical filter GF;

d13: on-axis thickness of the optical filter GF;

d14: on-axis distance from the image-side surface to the image surface Si of the optical filter GF;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

TABLE 2

| | Conic coefficient | Aspheric surface coefficients | | | | |
|---|---|---|---|---|---|---|
| | k | A4 | A6 | A8 | A10 | A12 |
| R1 | −3.8521E−01 | −1.8073E−02 | 1.2813E−01 | −3.3265E−01 | 5.3796E−01 | −5.5141E−01 |
| R2 | −6.1190E−01 | −4.8532E−02 | 6.4347E−02 | −6.3357E−02 | 3.2826E−02 | 7.4876E−03 |
| R3 | 6.9604E+01 | −8.5530E−02 | 2.0230E−01 | −3.9920E−01 | 6.5839E−01 | −7.6479E−01 |
| R4 | 2.9680E+00 | −9.3033E−02 | 5.3479E−01 | −1.9864E+00 | 4.9589E+00 | −7.8838E+00 |
| R5 | −1.4138E+02 | −5.3937E−02 | −3.0002E−02 | 2.3965E−01 | −6.8988E−01 | 1.0570E+00 |
| R6 | −9.8441E+01 | −9.6983E−02 | 1.9030E−01 | −5.5666E−01 | 1.0744E+00 | −1.3525E+00 |
| R7 | −1.0155E+02 | −1.2336E−01 | −1.0544E−03 | 1.8498E−01 | −3.3659E−01 | 3.2494E−01 |
| R8 | 4.3412E+01 | −1.3392E−01 | 3.9328E−02 | 3.5174E−02 | −6.0413E−02 | 4.3276E−02 |
| R9 | 1.8429E+00 | −1.0648E−02 | −3.6080E−02 | 2.7233E−02 | −1.4054E−02 | 4.3885E−03 |
| R10 | −4.2876E+00 | 5.9890E−02 | −5.3871E−02 | 2.8101E−02 | −1.0810E−02 | 2.7551E−03 |
| R11 | −9.9944E−01 | −9.5577E−02 | 3.4833E−02 | −6.5600E−03 | 9.1673E−04 | −1.0629E−04 |
| R12 | −1.5131E+01 | −6.2447E−02 | 2.2302E−02 | −6.0322E−03 | 1.1506E−03 | −1.4693E−04 |

| | Aspheric surface coefficients | | | |
|---|---|---|---|---|
| | A14 | A16 | A18 | A20 |
| R1 | 3.6018E−01 | −1.4525E−01 | 3.2972E−02 | −3.2354E−03 |
| R2 | −2.4095E−02 | 1.5429E−02 | −4.4093E−03 | 4.7503E−04 |
| R3 | 5.8679E−01 | −2.8144E−01 | 7.6422E−02 | −8.9597E−03 |
| R4 | 7.9416E+00 | −4.9050E+00 | 1.6950E+00 | −2.5059E−01 |

TABLE 2-continued

| | | | | |
|---|---|---|---|---|
| R5 | −9.8025E−01 | 5.5158E−01 | −1.7573E−01 | 2.4737E−02 |
| R6 | 1.0644E+00 | −5.0300E−01 | 1.2950E−01 | −1.3782E−02 |
| R7 | −1.9505E−01 | 7.2362E−02 | −1.5294E−02 | 1.4151E−03 |
| R8 | −1.7395E−02 | 4.0192E−03 | −4.9861E−04 | 2.5730E−05 |
| R9 | −7.9632E−04 | 8.3104E−05 | −4.6557E−06 | 1.0889E−07 |
| R10 | −4.3433E−04 | 4.0543E−05 | −2.0525E−06 | 4.3416E−08 |
| R11 | 9.5661E−06 | −5.8350E−07 | 2.0723E−08 | −3.2071E−10 |
| R12 | 1.1836E−05 | −5.6287E−07 | 1.4173E−08 | −1.4286E−10 |

In Table 2, k is a conic coefficient, and A4, A6, A8, A10, A12, A14, A16, A18 and A20 are aspheric surface coefficients.

It shall be noted that the non-spheres in each lens in this embodiment are ones represented by the following formula (23), but a specific form of the following formula (23) is only one example. Practically, the present disclosure is not limited to this formula.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (23)$$

Table 3 and Table 4 show design data of inflexion points and arrest points of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 1 | 1.395 | | |
| P1R2 | 1 | 1.035 | | |
| P2R1 | | | | |
| P2R2 | | | | |
| P3R1 | 1 | 0.335 | | |
| P3R2 | 2 | 0.265 | 1.305 | |
| P4R1 | 1 | 0.205 | | |
| P4R2 | 3 | 0.215 | 1.405 | 1.755 |
| P5R1 | 2 | 0.695 | 1.975 | |
| P5R2 | 3 | 2.115 | 2.985 | 3.115 |
| P6R1 | 2 | 1.605 | 3.465 | |
| P6R2 | 3 | 0.565 | 3.095 | 3.665 |

TABLE 4

| | Number(s) of arrest points | Arrest point position 1 | Arrest point position 2 |
|---|---|---|---|
| P1R1 | | | |
| P1R2 | 1 | 1.325 | |
| P2R1 | | | |
| P2R2 | | | |

TABLE 4-continued

| | Number(s) of arrest points | Arrest point position 1 | Arrest point position 2 |
|---|---|---|---|
| P3R1 | 1 | 0.575 | |
| P3R2 | 1 | 0.465 | |
| P4R1 | 1 | 0.345 | |
| P4R2 | 1 | 0.375 | |
| P5R1 | 2 | 1.145 | 2.685 |
| P5R2 | | | |
| P6R1 | 1 | 2.955 | |
| P6R2 | 1 | 1.215 | |

In addition, Table 21 in the following shows various values of Embodiments 1 and values corresponding to parameters which are specified in the above conditions.

Figure 2:
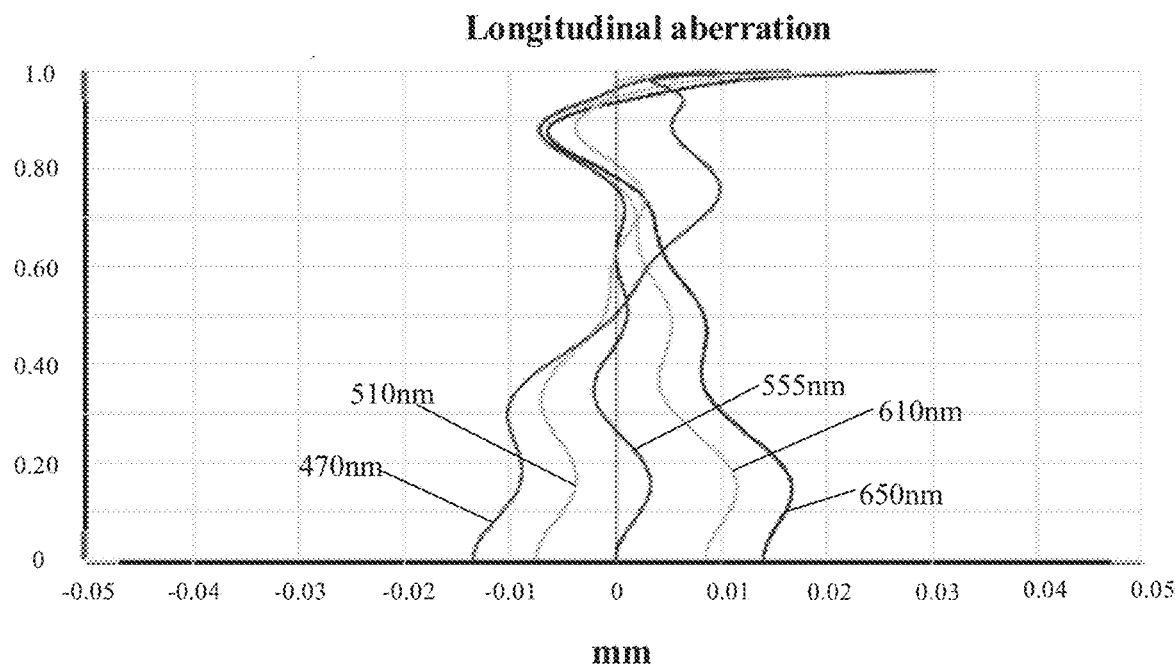
FIG. 2 is a schematic diagram of a longitudinal aberration of the camera optical lens shown in FIG. 1.
Figure 3:
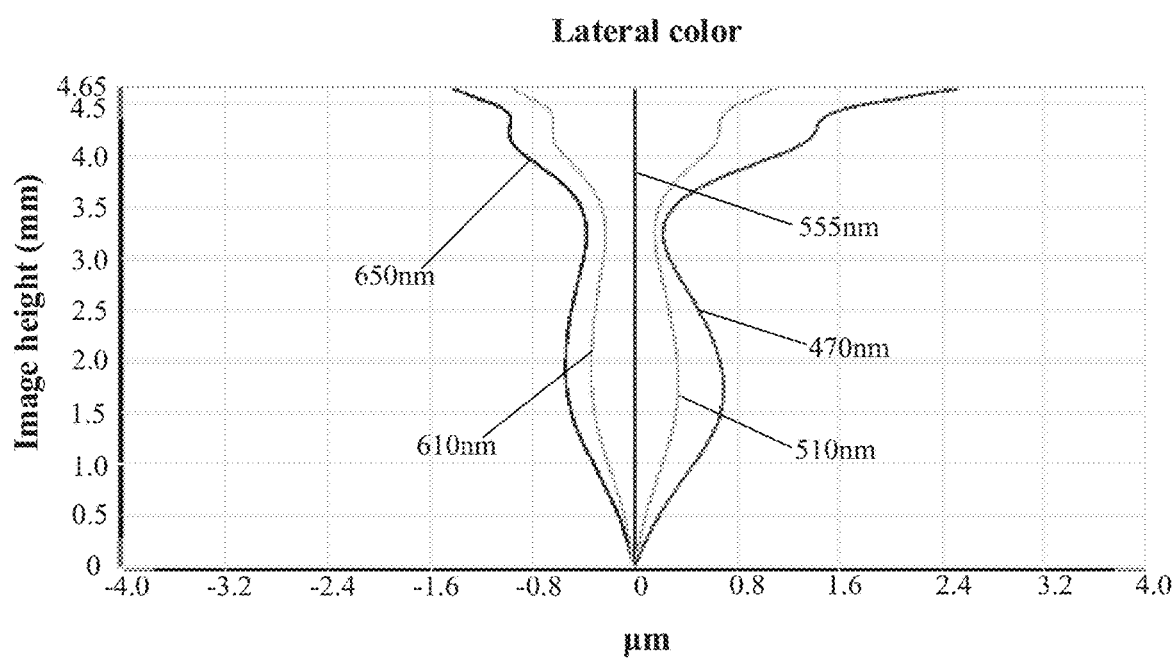
FIG. 3 is a schematic diagram of a lateral color of the camera optical lens shown in FIG. 1.
Figure 4:
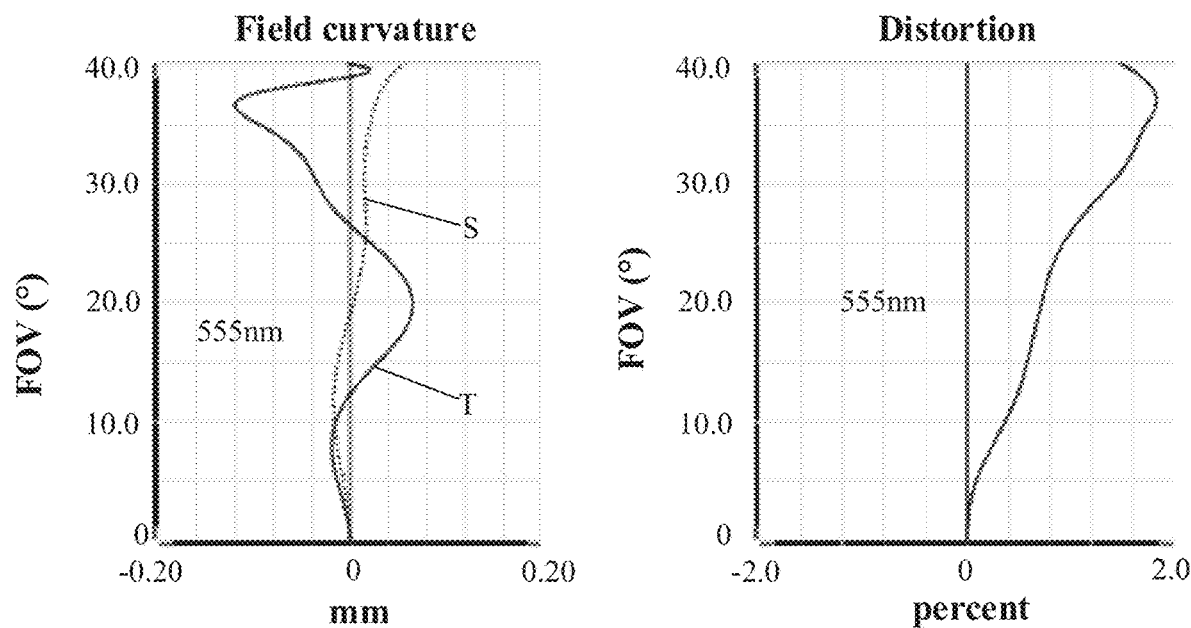
FIG. 4 is a schematic diagram of a field curvature and a distortion of the camera optical lens shown in FIG. 1.

FIG. 2 and FIG. 3 illustrate a longitudinal aberration and a lateral color with wavelengths of 650 nm, 610 nm, 555 nm, 510 nm and 470 nm after passing the camera optical lens 10 according to Embodiment 1, respectively. FIG. 4 illustrates a field curvature and a distortion with a wavelength of 555 nm after passing the camera optical lens 10 according to Embodiment 1. A field curvature S in FIG. 4 is a field curvature in a sagittal direction, and T is a field curvature in a tangential direction.

M this embodiment, an entrance pupil diameter of the camera optical lens 10 is 2.860 mm, an image height of 1.0H is 4.649 mm, a FOV (field of view) in a diagonal direction is 80.00°. Thus, the camera optical lens has a wide-angle and is ultra-thin. Its on-axis and off-axis aberrations are fully corrected, thereby achieving excellent optical characteristics.

Embodiment 2

Figure 5:
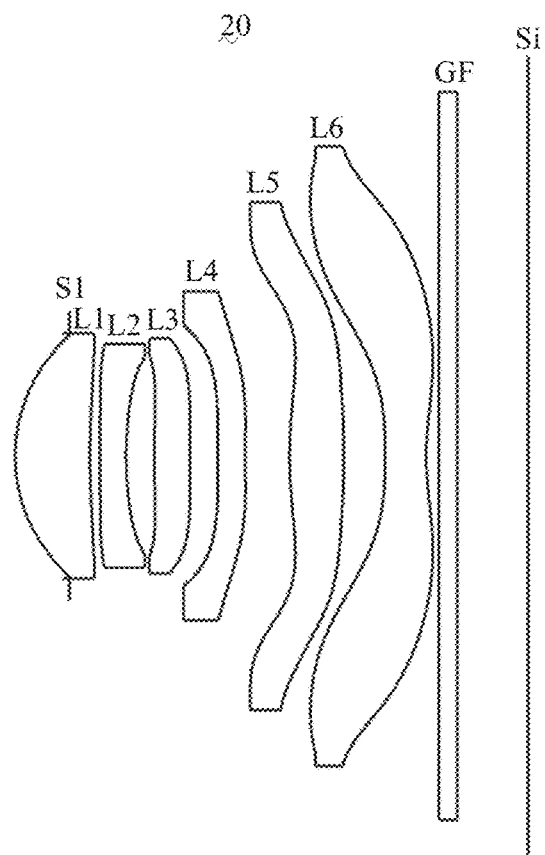
FIG. 5 is a schematic diagram of a structure of a camera optical lens according to Embodiment 2 of the present disclosure.

FIG. 5 is a schematic diagram of a structure of a camera optical lens 20 according to Embodiment 2 of the present disclosure. Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | | nd | | vd |
|---|---|---|---|---|---|---|
| S1 | ∞ | d0= | −0.632 | | | |
| R1 | 1.857 | d1= | 0.872 | nd1 | 1.5445 v1 | 54.93 |
| R2 | 8.352 | d2= | 0.116 | | | |
| R3 | 17.359 | d3= | 0.313 | nd2 | 1.6702 v2 | 19.30 |
| R4 | 4.145 | d4= | 0.328 | | | |
| R5 | 10.039 | d5= | 0.412 | nd3 | 1.5849 v3 | 28.43 |
| R6 | 19.691 | d6= | 0.327 | | | |
| R7 | 19.096 | d7= | 0.320 | nd4 | 1.6150 v4 | 23.36 |
| R8 | 14.660 | d8= | 0.518 | | | |

TABLE 5-continued

| | R | d | nd | | vd | |
|---|---|---|---|---|---|---|
| R9 | 5.472 | d9= | 0.633 | nd5 | 1.5450 v5 | 54.15 |
| R10 | −7.083 | d10= | 0.483 | | | |
| R11 | −6.734 | d11= | 0.484 | nd6 | 1.5433 v6 | 51.62 |
| R12 | 3.057 | d12= | 0.150 | | | |
| R13 | ∞ | d13= | 0.210 | ndg | 1.5168 vg | 64.21 |
| R14 | ∞ | d14= | 0.827 | | | |

TABLE 6

| | Conic coefficient | Aspheric surface coefficients | | | | |
|---|---|---|---|---|---|---|
| | k | A4 | A6 | A8 | A10 | A12 |
| R1 | −3.9907E−01 | −1.8979E−02 | 1.2879E−01 | −3.3290E−01 | 5.3784E−01 | −5.5144E−01 |
| R2 | −7.0223E+00 | −4.9686E−02 | 6.4066E−02 | −6.3304E−02 | 3.2875E−02 | 7.4932E−03 |
| R3 | 6.4396E+01 | −8.6697E−02 | 2.0177E−01 | −3.9901E−01 | 6.5862E−01 | −7.6471E−01 |
| R4 | 2.3529E+00 | −9.5594E−02 | 5.3604E−01 | −1.9867E+00 | 4.9590E+00 | −7.8838E+00 |
| R5 | −6.3788E+01 | −5.3860E−02 | −2.9676E−02 | 2.4068E−01 | −6.8950E−01 | 1.0569E+00 |
| R6 | −4.3431E+01 | −9.7135E−02 | 1.8908E−01 | −5.5693E−01 | 1.0744E+00 | −1.3523E+00 |
| R7 | −5.2053E+01 | −1.2327E−01 | −2.0207E−03 | 1.8506E−01 | −3.3644E−01 | 3.2489E−01 |
| R8 | 4.1830E+01 | −1.3234E−01 | 3.9701E−02 | 3.5053E−02 | −6.0434E−02 | 4.3274E−02 |
| R9 | 1.8661E+01 | −1.0884E−02 | −3.6075E−02 | 2.7235E−02 | −1.4054E−02 | 4.3885E−03 |
| R10 | −3.5135E+00 | 5.9273E−02 | −5.3921E−02 | 2.8100E−02 | −1.0809E−02 | 2.7551E−03 |
| R11 | −1.0016E+00 | −9.5610E−02 | 3.4829E−02 | −6.5604E−03 | 9.1671E−04 | −1.0629E−04 |
| R12 | −2.0085E+01 | −6.2141E−02 | 2.2287E−02 | −6.0325E−03 | 1.1506E−03 | −1.4693E−04 |

| | Aspheric surface coefficients | | | |
|---|---|---|---|---|
| | A14 | A16 | A18 | A20 |
| R1 | 3.6018E−01 | −1.4525E−01 | 3.2973E−02 | −3.2359E−03 |
| R2 | −2.4083E−02 | 1.5434E−02 | −4.4099E−03 | 4.7207E−04 |
| R3 | 5.8680E−01 | −2.8147E−01 | 7.6404E−02 | −8.9609E−03 |
| R4 | 7.9417E+00 | −4.9049E+00 | 1.6950E+00 | −2.5076E−01 |
| R5 | −9.8053E−01 | 5.5142E−01 | −1.7571E−01 | 2.4906E−02 |
| R6 | 1.0645E+00 | −5.0301E−01 | 1.2950E−01 | −1.3779E−02 |
| R7 | −1.9505E−01 | 7.2377E−02 | −1.5286E−02 | 1.4176E−03 |
| R8 | −1.7395E−02 | 4.0193E−03 | −4.9857E−04 | 2.5742E−05 |
| R9 | −7.9632E−04 | 8.3104E−05 | −4.6557E−06 | 1.0890E−07 |
| R10 | −4.3433E−04 | 4.0543E−05 | −2.0525E−06 | 4.3413E−08 |
| R11 | 9.5662E−06 | −5.8348E−07 | 2.0724E−08 | −3.2071E−10 |
| R12 | 1.1836E−05 | −5.6287E−07 | 1.4173E−08 | −1.4281E−10 |

Table 7 and table 8 show design data of inflexion points and arrest points of each lens of the camera optical lens 20 lens according to Embodiment 2 of the present disclosure.

TABLE 7

| | Number(s) of inflexion points | Inflexion point position 1 | Inflexion point position 2 | Inflexion point position 3 |
|---|---|---|---|---|
| P1R1 | 1 | 1.385 | | |
| P1R2 | 1 | 0.945 | | |
| P2R1 | 2 | 0.315 | 0.595 | |
| P2R2 | | | | |
| P3R1 | 2 | 0.375 | 1.195 | |
| P3R2 | 2 | 0.235 | 1.305 | |
| P4R1 | 2 | 0.195 | 1.505 | |
| P4R2 | 3 | 0.215 | 1.405 | 1.725 |
| P5R1 | 2 | 0.695 | 1.975 | |
| P5R2 | 1 | 2.135 | | |
| P6R1 | 2 | 1.605 | 3.525 | |
| P6R2 | 2 | 0.535 | 3.085 | |

TABLE 8

| | Number of arrest points | Arrest point position 1 | Arrest point position 2 |
|---|---|---|---|
| P1R1 | | | |
| P1R2 | 1 | 1.295 | |
| P2R1 | | | |
| P2R2 | | | |
| P3R1 | 1 | 0.655 | |
| P3R2 | 1 | 0.425 | |
| P4R1 | 1 | 0.325 | |
| P4R2 | 1 | 0.375 | |
| P5R1 | 2 | 1.135 | 2.695 |
| P5R2 | | | |
| P6R1 | 1 | 2.995 | |
| P6R2 | 1 | 1.125 | |

In addition, Table 21 in the following shows various values of Embodiments 2 and values corresponding to parameters which are specified in the above conditions.

Figure 6:
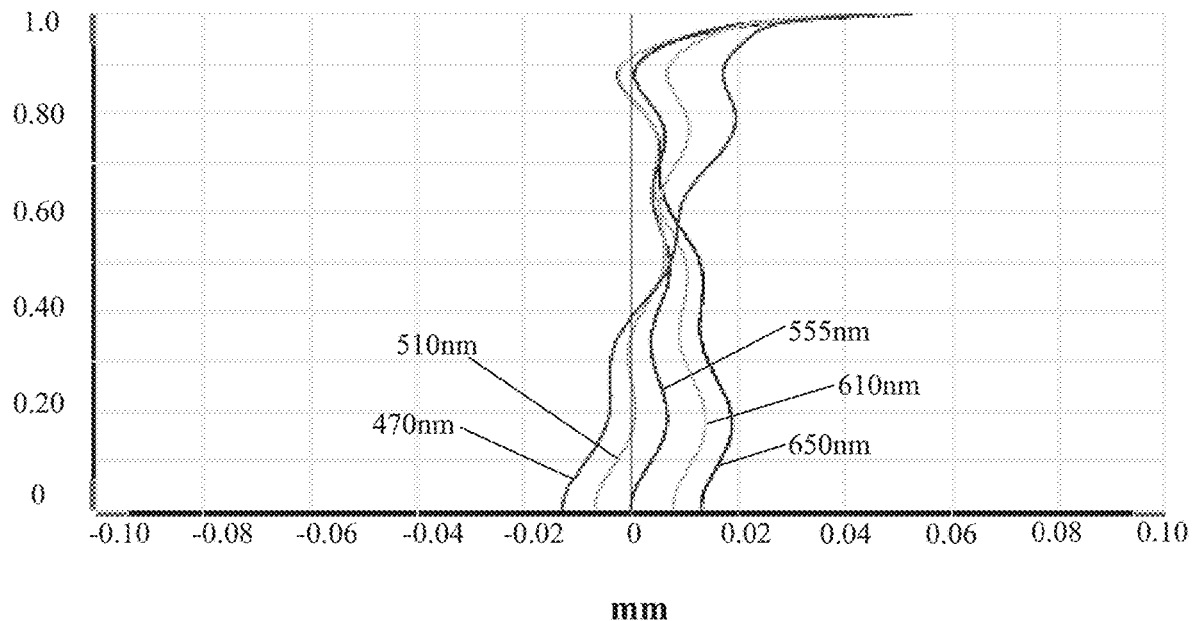
FIG. 6 is a schematic diagram of a longitudinal aberration of the camera optical lens shown in FIG. 5.
Figure 7:
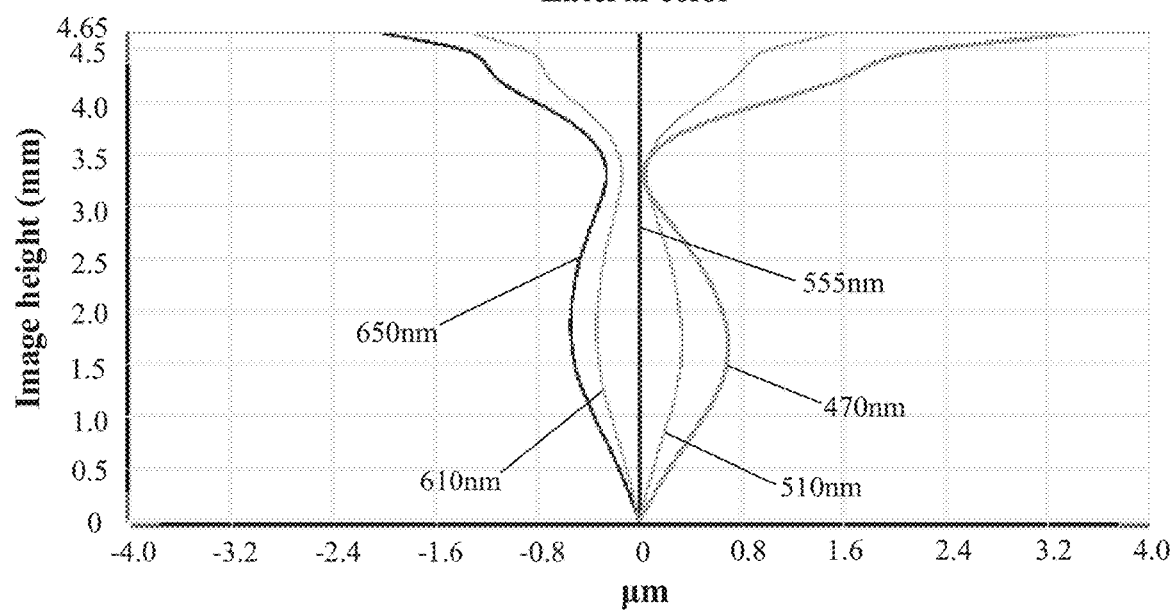
FIG. 7 is a schematic diagram of a lateral color of the camera optical lens shown in FIG. 5.
Figure 8:
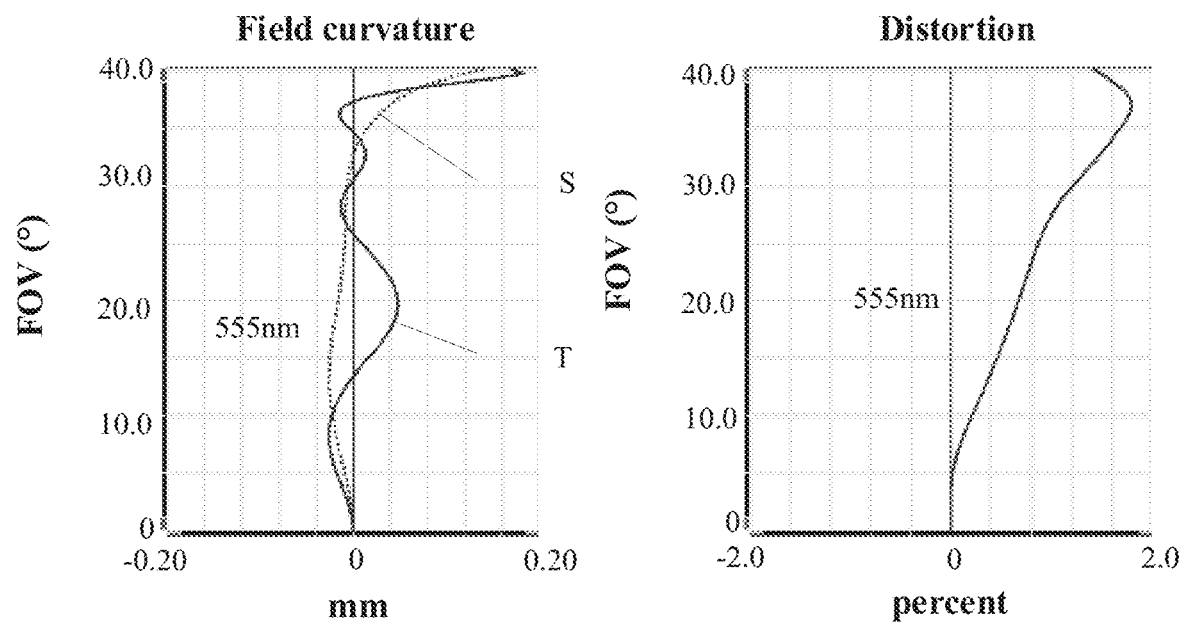
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm and 470 nm after passing the camera optical lens 20 according to Embodiment 2. FIG. 8 illustrates a field curvature and a distortion of light with a wavelength of 555 nm after passing the camera optical lens 20 according to Embodiment 2. A field curvature S in FIG. 8 is a field curvature in a sagittal direction, and T is a field curvature in a tangential direction.

In this embodiment, an entrance pupil diameter of the camera optical lens 20 is 2.861 mm, an image height of 1.0H is 4.649 mm, a FOV (field of view) in the diagonal direction is 80.00°. Thus, the camera optical lens has a wide-angle and is ultra-thin. Its on-axis and off-axis aberrations are fully corrected, thereby achieving excellent optical characteristics.

Embodiment 3

Figure 9:
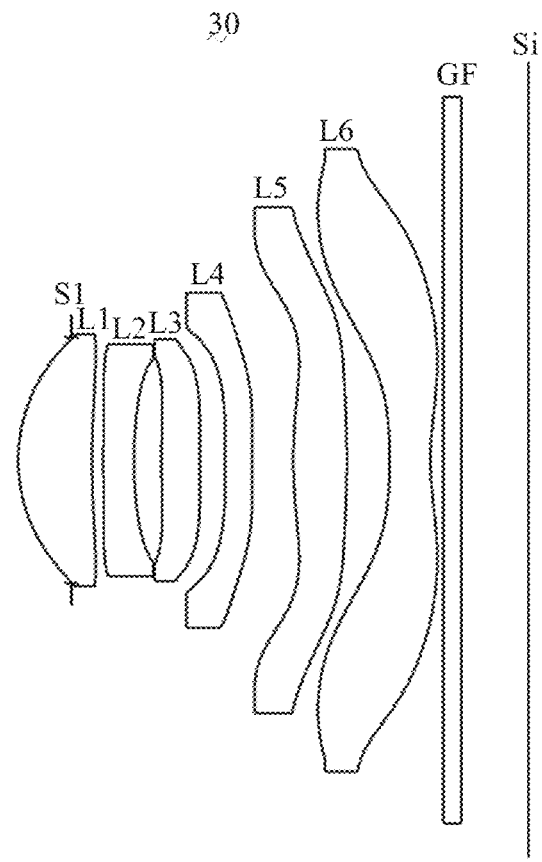
FIG. 9 is a schematic diagram of a structure of a camera optical lens according to Embodiment 3 of the present disclosure.

FIG. 9 is a schematic diagram of a structure of a camera optical lens 30 according to Embodiment 3 of the present disclosure. Embodiment 3 is basically the same as Embodiment 1 and involves symbols having the same meanings as Embodiment 1, and only differences therebetween will be described in the following.

Table 9 and Table 10 show design data of the camera optical lens 30 in Embodiment 3 of the present disclosure.

TABLE 9

|  | R | d | nd | vd |
|---|---|---|---|---|
| S1 | ∞ | d0= | −0.622 | | |
| R1 | 1.854 | d1= | 0.867 | nd1 | 1.5450 | v1 | 55.81 |
| R2 | 8.324 | d2= | 0.133 | | |
| R3 | 21.115 | d3= | 0.358 | nd2 | 1.6700 | v2 | 19.39 |
| R4 | 4.337 | d4= | 0.326 | | |
| R5 | 11.921 | d5= | 0.450 | nd3 | 1.5843 | v3 | 28.25 |
| R6 | 54.228 | d6= | 0.293 | | |
| R7 | 29.259 | d7= | 0.320 | nd4 | 1.6153 | v4 | 25.94 |
| R8 | 15.389 | d8= | 0.483 | | |
| R9 | 5.440 | d9= | 0.630 | nd5 | 1.5450 | v5 | 55.81 |
| R10 | −8.008 | d10= | 0.500 | | |
| R11 | −6.886 | d11= | 0.480 | nd6 | 1.5450 | v6 | 55.81 |
| R12 | 3.044 | d12= | 0.150 | | |
| R13 | ∞ | d13= | 0.210 | ndg | 1.5168 | vg | 64.21 |
| R14 | ∞ | d14= | 0.789 | | |

Table 11 and Table 12 show design data inflexion points and arrest points of the respective lenses in the camera optical lens 30 according to Embodiment 3 of the present disclosure.

TABLE 11

| | Number(s) of inflexion points | Inflexion point position 1 | Inflexion point position 2 | Inflexion point position 3 | Inflexion point position 4 |
|---|---|---|---|---|---|
| P1R1 | 1 | 1.375 | | | |
| P1R2 | 1 | 0.855 | | | |
| P2R1 | 2 | 0.265 | 0.655 | | |
| P2R2 | | | | | |
| P3R1 | 2 | 0.355 | 1.195 | | |
| P3R2 | 2 | 0.135 | 1.315 | | |
| P4R1 | 2 | 0.155 | 1.505 | | |
| P4R2 | 1 | 0.215 | | | |
| P5R1 | 2 | 0.695 | 1.975 | | |
| P5R2 | 1 | 2.125 | | | |
| P6R1 | 2 | 1.595 | 3.525 | | |
| P6R2 | 4 | 0.545 | 3.055 | 3.685 | 4.015 |

TABLE 12

| | Number of arrest points | Arrest point position 1 | Arrest point position 2 |
|---|---|---|---|
| P1R1 | | | |
| P1R2 | 1 | 1.275 | |
| P2R1 | | | |
| P2R2 | | | |
| P3R1 | 1 | 0.625 | |
| P3R2 | 1 | 0.235 | |
| P4R1 | 1 | 0.265 | |

TABLE 10

| | Conic coefficient | Aspherical surface coefficients | | | | |
|---|---|---|---|---|---|---|
| | k | A4 | A6 | A8 | A10 | A12 |
| R1 | −4.2560E−01 | −2.0332E−02 | 1.2902E−01 | −3.3295E−01 | 5.3780E−01 | −5.5145E−01 |
| R2 | −8.7605E+00 | −5.0098E−02 | 6.3738E−02 | −6.3381E−02 | 3.2876E−02 | 7.5157E−03 |
| R3 | 5.7496E+01 | −8.7219E−02 | 2.0169E−01 | −3.9907E−01 | 6.5864E−01 | −7.6467E−01 |
| R4 | 2.0607E+00 | −9.5863E−02 | 5.3519E−01 | −1.9866E+00 | 4.9590E+00 | −7.8838E+00 |
| R5 | −4.3894E+01 | −5.3850E−02 | −3.0476E−02 | 2.4039E−01 | −6.8912E−01 | 1.0569E+00 |
| R6 | 1.0559E+02 | −9.6974E−02 | 1.8910E−01 | −5.5714E−01 | 1.0743E+00 | −1.3524E+00 |
| R7 | −1.2387E+02 | −1.2396E−01 | −3.4999E−03 | 1.8511E−01 | −3.3626E−01 | 3.2488E−01 |
| R8 | 4.3575E+01 | −1.3312E−01 | 3.9794E−02 | 3.5050E−02 | −6.0445E−02 | 4.3271E−02 |
| R9 | 1.8641E+00 | −1.0985E−02 | −3.6073E−02 | 2.7235E−02 | −1.4054E−02 | 4.3885E−03 |
| R10 | −6.6832E+00 | 5.9533E−02 | −5.3931E−02 | 2.8100E−02 | −1.0809E−02 | 2.7551E−03 |
| R11 | −1.2610E+00 | −9.5514E−02 | 3.4831E−02 | −6.5602E−03 | 9.1672E−04 | −1.0629E−04 |
| R12 | −1.8639E+01 | −6.1832E−02 | 2.2311E−02 | −6.0320E−03 | 1.1506E−03 | −1.4693E−04 |

| | Aspherical surface coefficients | | | |
|---|---|---|---|---|
| | A14 | A16 | A18 | A20 |
| R1 | 3.6017E−01 | −1.4525E−01 | 3.2973E−02 | −3.2357E−03 |
| R2 | −2.4085E−02 | 1.5433E−02 | −4.4105E−03 | 4.7188E−04 |
| R3 | 5.8680E−01 | −2.8146E−01 | 7.6403E−02 | −8.9615E−03 |
| R4 | 7.9418E+00 | −4.9049E+00 | 1.6950E+00 | −2.5076E−01 |
| R5 | −9.8059E−01 | 5.5141E−01 | −1.7572E−01 | 2.4903E−02 |
| R6 | 1.0645E+00 | −5.0303E−01 | 1.2950E−01 | −1.3782E−02 |
| R7 | −1.9505E−01 | 7.2375E−02 | −1.5287E−02 | 1.4171E−03 |
| R8 | −1.7396E−02 | 4.0192E−03 | −4.9858E−04 | 2.5749E−05 |
| R9 | −7.9632E−04 | 8.3104E−05 | −4.6557E−06 | 1.0889E−07 |
| R10 | −4.3433E−04 | 4.0543E−05 | −2.0525E−06 | 4.3411E−08 |
| R11 | 9.5663E−06 | −5.8348E−07 | 2.0724E−08 | −3.2074E−10 |
| R12 | 1.1836E−05 | −5.6288E−07 | 1.4172E−08 | −1.4284E−10 |

TABLE 12-continued

| | Number of arrest points | Arrest point position 1 | Arrest point position 2 |
|---|---|---|---|
| P4R2 | 1 | 0.365 | |
| P5R1 | 1 | 1.145 | |
| P5R2 | | | |
| P6R1 | 2 | 2.905 | 3.695 |
| P6R2 | 1 | 1.145 | |

In addition, Table 21 in the following shows various values of Embodiments 3 and values corresponding to parameters which are specified in the above conditions.

Figure 10:
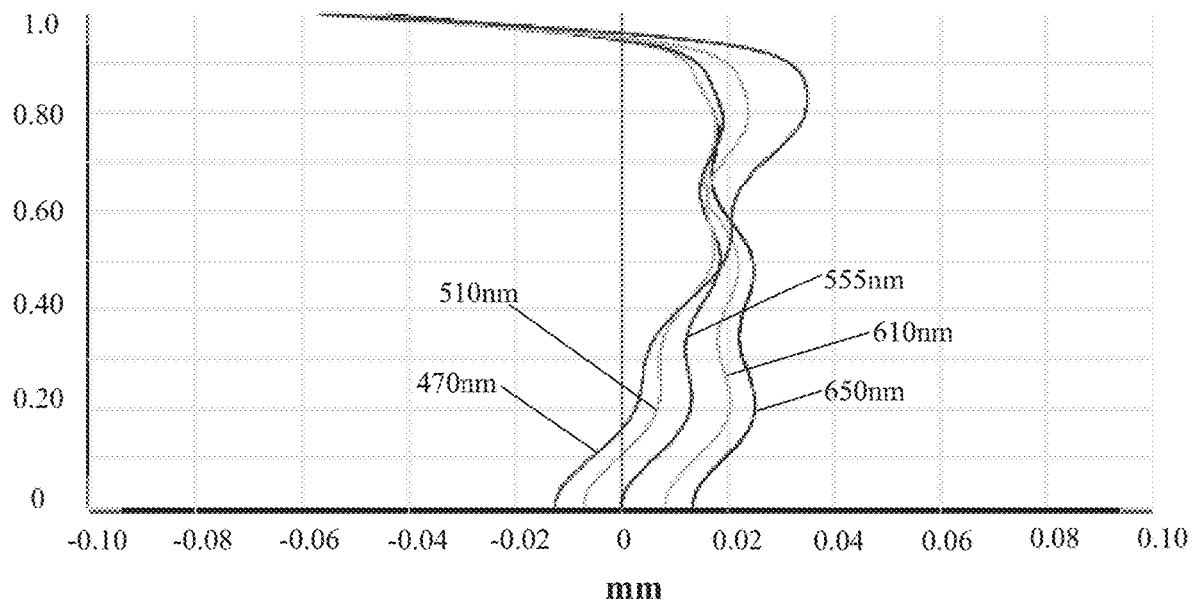
FIG. 10 is a schematic diagram of a longitudinal aberration of the camera optical lens shown in FIG. 9.
Figure 11:
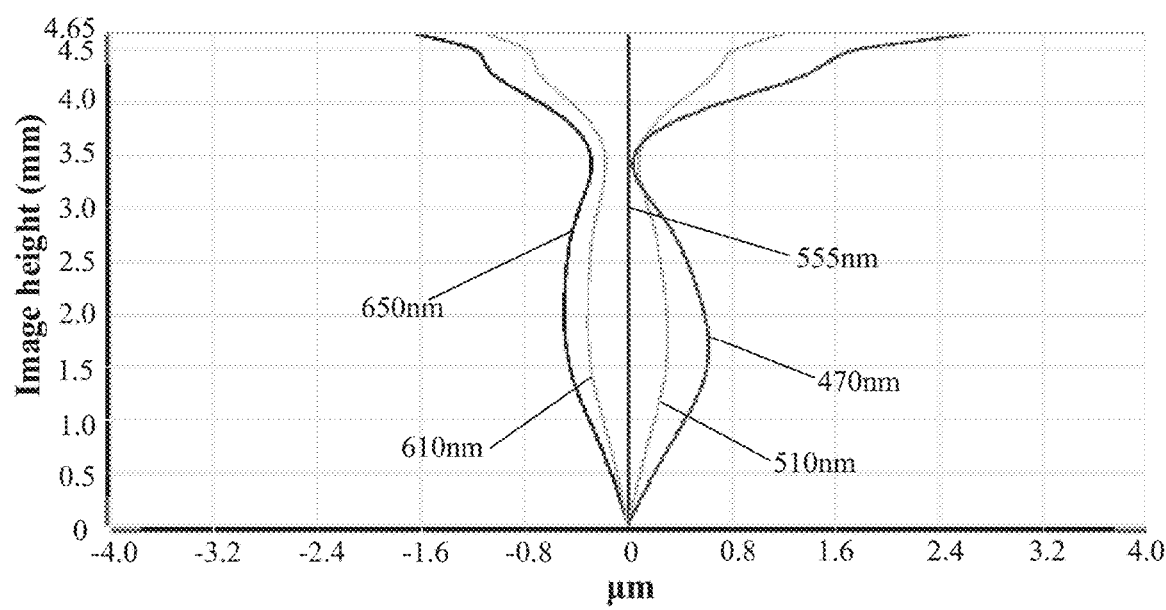
FIG. 11 is a schematic diagram of a lateral color of the camera optical lens shown in FIG. 9.
Figure 12:
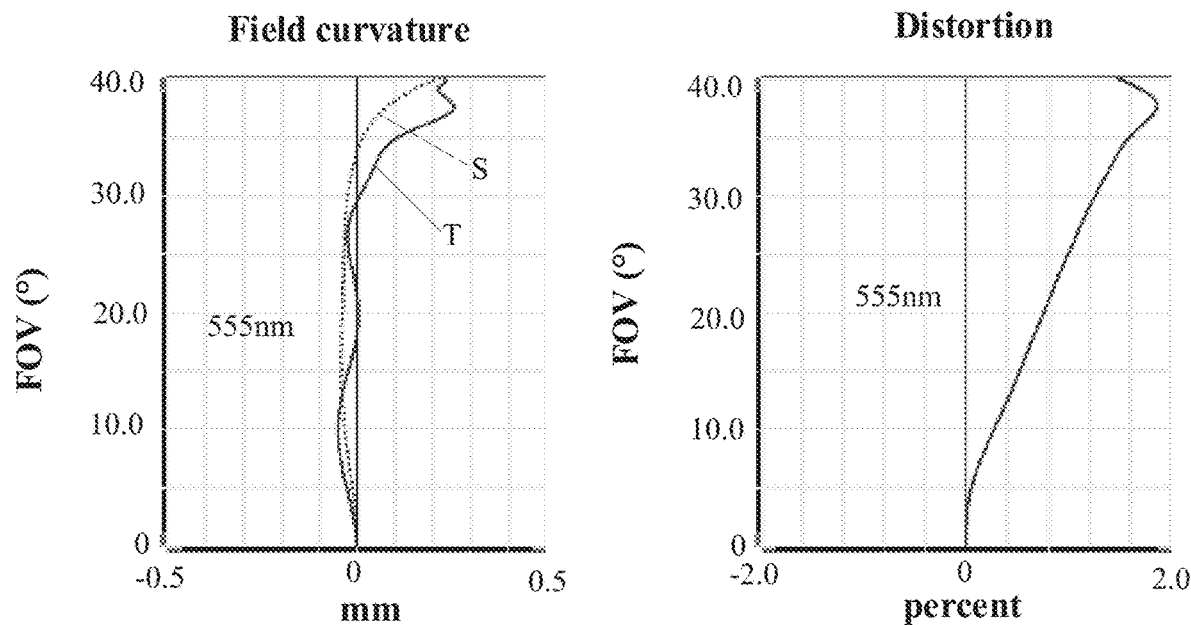
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm and 470 nm after passing the camera optical lens 30 according to Embodiment 3. FIG. 12 illustrates a field curvature and a distortion of light with a wavelength of 555 nm after passing the camera optical lens 30 according to Embodiment 3. A field curvature S in FIG. 12 is a field curvature in a sagittal direction, and T is a field curvature in a tangential direction.

ment 1 and involves symbols having the same meanings as Embodiment 1, and only differences therebetween will be described in the following.

Table 13 and Table 14 show design data of the camera optical lens 40 in Embodiment 4 of the present disclosure.

TABLE 13

| | R | d | | nd | | vd |
|---|---|---|---|---|---|---|
| S1 | ∞ | d0= | −0.643 | | | |
| R1 | 1.860 | d1= | 0.900 | nd1 | 1.5451 | v1 | 55.55 |
| R2 | 4.651 | d2= | 0.067 | | | |
| R3 | 6.023 | d3= | 0.365 | nd2 | 1.6676 | v2 | 19.44 |
| R4 | 3.849 | d4= | 0.357 | | | |
| R5 | 11.209 | d5= | 0.384 | nd3 | 1.5820 | v3 | 32.64 |
| R6 | 16.595 | d6= | 0.362 | | | |
| R7 | 14.482 | d7= | 0.320 | nd4 | 1.6183 | v4 | 24.65 |
| R8 | 12.124 | d8= | 0.578 | | | |
| R9 | 4.900 | d9= | 0.645 | nd5 | 1.5427 | v5 | 54.68 |
| R10 | −7.350 | d10= | 0.458 | | | |
| R11 | −5.114 | d11= | 0.480 | nd6 | 1.5396 | v6 | 53.22 |
| R12 | 3.064 | d12= | 0.496 | | | |
| R13 | ∞ | d13= | 0.210 | ndg | 1.5168 | vg | 64.21 |
| R14 | ∞ | d14= | 0.370 | | | |

TABLE 14

| | Conic coefficient | Aspherical surface coefficients | | | | |
|---|---|---|---|---|---|---|
| | k | A4 | A6 | A8 | A10 | A12 |
| R1 | −3.0573E−01 | −8.6627E−03 | 8.1125E−02 | −2.5611E−01 | 5.0167E−01 | −6.0163E−01 |
| R2 | −2.3556E+01 | −1.1551E−01 | 2.4582E−01 | −4.2118E−01 | 5.0327E−01 | −3.7269E−01 |
| R3 | −4.4734E+01 | −1.4767E−01 | 3.5388E−01 | −7.0290E−01 | 1.0606E+00 | −1.0751E+00 |
| R4 | −1.3498E+00 | −1.0097E−01 | 4.8968E−01 | −1.6733E+00 | 4.0355E+00 | −6.2904E+00 |
| R5 | 3.6815E+01 | −1.0031E−01 | 3.2407E−01 | −1.3844E+00 | 3.6209E+00 | −5.9616E+00 |
| R6 | −1.6273E+01 | −8.8148E−02 | 2.0549E−01 | −7.5186E−01 | 1.7209E+00 | −2.4620E+00 |
| R7 | −6.0332E+01 | −1.4040E−01 | 1.1146E−01 | −1.3139E−01 | 1.4890E−01 | −1.4395E−01 |
| R8 | 5.2481E+00 | −1.4496E−01 | 1.0326E−01 | −9.5758E−02 | 8.4250E−02 | −5.5707E−02 |
| R9 | 1.4509E+00 | −2.8449E−02 | −1.2250E−02 | 1.3209E−02 | −8.1802E−03 | 2.5748E−03 |
| R10 | −4.5467E+00 | 2.0867E−02 | −2.8043E−02 | 2.2109E−02 | −1.0760E−02 | 2.9855E−03 |
| R11 | −1.4974E+00 | −1.4269E−01 | 7.6505E−02 | −2.2504E−02 | 4.4395E−03 | −5.9210E−04 |
| R12 | −2.2888E+01 | −7.5695E−02 | 3.3114E−02 | −9.3655E−03 | 1.6223E−03 | −1.6146E−04 |

| | Aspherical surface coefficients | | | |
|---|---|---|---|---|
| | A14 | A16 | A18 | A20 |
| R1 | 4.4557E−01 | −1.9863E−01 | 4.8864E−02 | −5.1042E−03 |
| R2 | 1.5345E−01 | −2.5320E−02 | −2.5753E−03 | 1.0242E−03 |
| R3 | 7.0535E−01 | −2.8756E−01 | 6.6677E−02 | −6.8075E−03 |
| R4 | 6.2391E+00 | −3.7940E+00 | 1.2886E+00 | −1.8666E−01 |
| R5 | 6.1538E+00 | −3.8598E+00 | 1.3416E+00 | −1.9740E−01 |
| R6 | 2.1699E+00 | −1.1445E+00 | 3.3046E−01 | −3.9966E−02 |
| R7 | 9.5070E−02 | −3.9412E−02 | 9.0665E−03 | −8.5207E−04 |
| R8 | 2.4491E−02 | −6.5172E−03 | 9.3943E−04 | −5.6207E−05 |
| R9 | −4.3383E−04 | 4.0129E−05 | −1.9153E−06 | 3.6397E−08 |
| R10 | −4.8087E−04 | 4.4764E−05 | −2.2386E−06 | 4.6596E−08 |
| R11 | 5.1892E−05 | −2.8346E−06 | 8.6817E−08 | −1.1299E−09 |
| R12 | 7.1121E−06 | 1.1532E−07 | −2.2495E−08 | 5.8814E−10 |

In this embodiment, an entrance pupil diameter of the camera optical lens 30 is 2.862 mm, an image height of 1.0H is 4.649 mm, a FOV (field of view) in the diagonal direction is 80.00°. Thus, the camera optical lens has a wide-angle and is ultra-thin. Its on-axis and off-axis aberrations are fully corrected, thereby achieving excellent optical characteristics.

Embodiment 4

Figure 13:
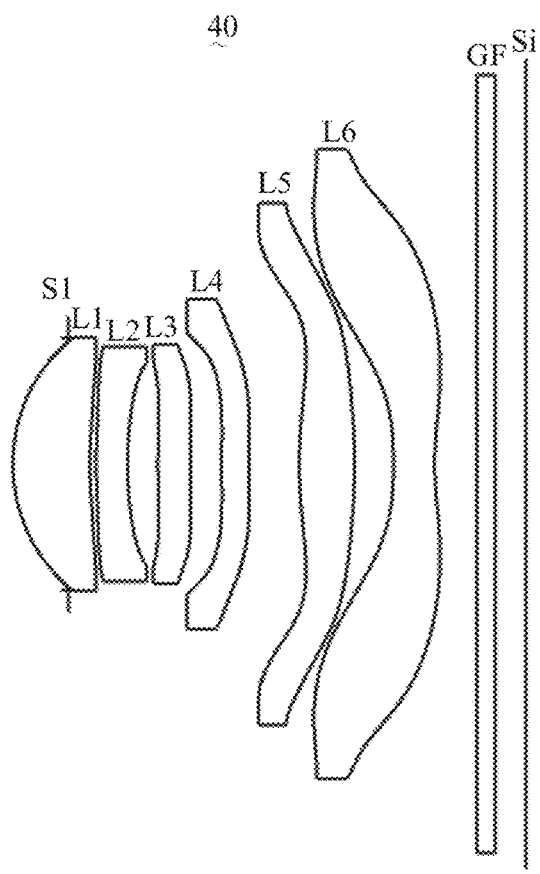
FIG. 13 is a schematic diagram of a structure of a camera optical lens according to Embodiment 4 of the present disclosure.

FIG. 13 is a schematic diagram of a structure of a camera optical lens 40 according to Embodiment 4 of the present disclosure. Embodiment 4 is basically the same as Embodi- Table 15 and table 16 show design data of inflexion points and arrest points of each lens of the camera optical lens 40 lens according to Embodiment 4 of the present disclosure.

TABLE 15

| | Number(s) of inflexion points | Inflexion point position 1 | Inflexion point position 2 | Inflexion point position 3 | Inflexion point position 4 |
|---|---|---|---|---|---|
| P1R1 | 1 | 1.415 | | | |
| P1R2 | 3 | 0.665 | 0.775 | 1.125 | |
| P2R1 | 3 | 0.415 | 0.705 | 1.295 | |

TABLE 15-continued

| | Number(s) of inflexion points | Inflexion point position 1 | Inflexion point position 2 | Inflexion point position 3 | Inflexion point position 4 |
|---|---|---|---|---|---|
| P2R2 | | | | | |
| P3R1 | 2 | 0.365 | 1.135 | | |
| P3R2 | 2 | 0.285 | 1.245 | | |
| P4R1 | 2 | 0.215 | 1.455 | | |
| P4R2 | 3 | 0.235 | 1.485 | 1.655 | |
| P5R1 | 2 | 0.735 | 2.065 | | |
| P5R2 | 1 | 2.215 | | | |
| P6R1 | 3 | 1.505 | 3.275 | 3.405 | |
| P6R2 | 4 | 0.495 | 3.015 | 3.495 | 3.615 |

TABLE 16

| | Number of arrest points | Arrest point position 1 |
|---|---|---|
| P1R1 | | |
| P1R2 | 1 | 1.315 |
| P2R1 | | |
| P2R2 | | |
| P3R1 | 1 | 0.625 |
| P3R2 | 1 | 0.495 |
| P4R1 | 1 | 0.375 |
| P4R2 | 1 | 0.405 |
| P5R1 | 1 | 1.235 |
| P5R2 | | |
| P6R1 | 1 | 2.945 |
| P6R2 | 1 | 1.055 |

In addition, Table 21 in the following shows various values of Embodiments 4 and values corresponding to parameters which are specified in the above conditions.

Figure 14:
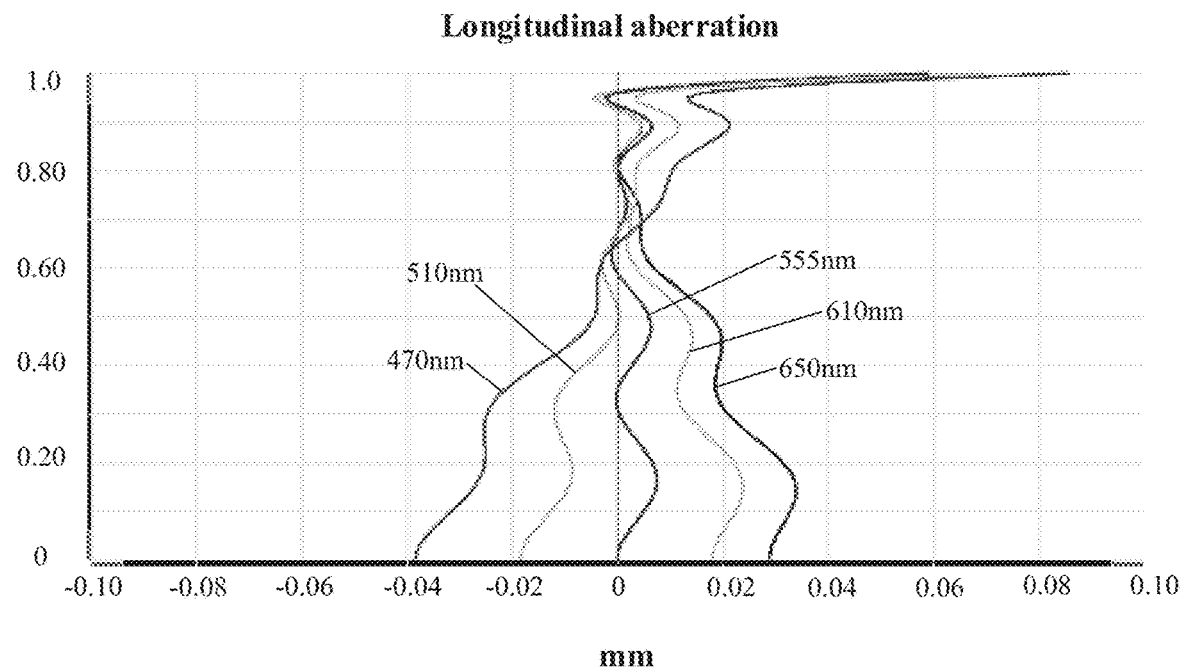
FIG. 14 is a schematic diagram of a longitudinal aberration of the camera optical lens shown in FIG. 13.
Figure 15:
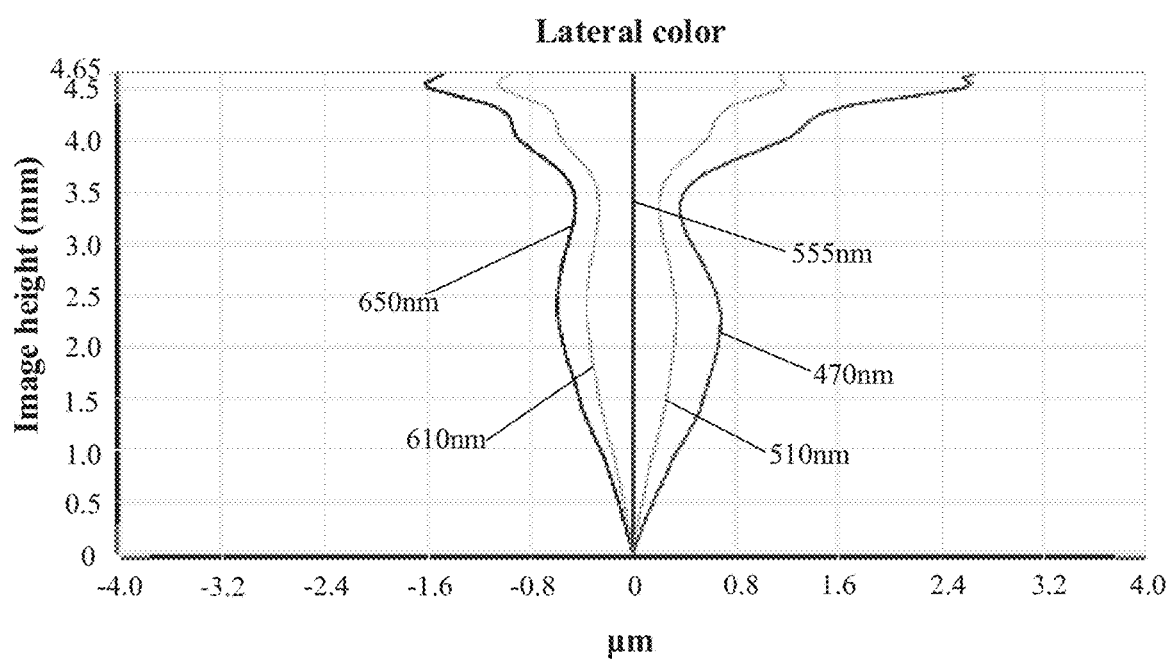
FIG. 15 is a schematic diagram of a lateral color of the camera optical lens shown in FIG. 13.
Figure 16:
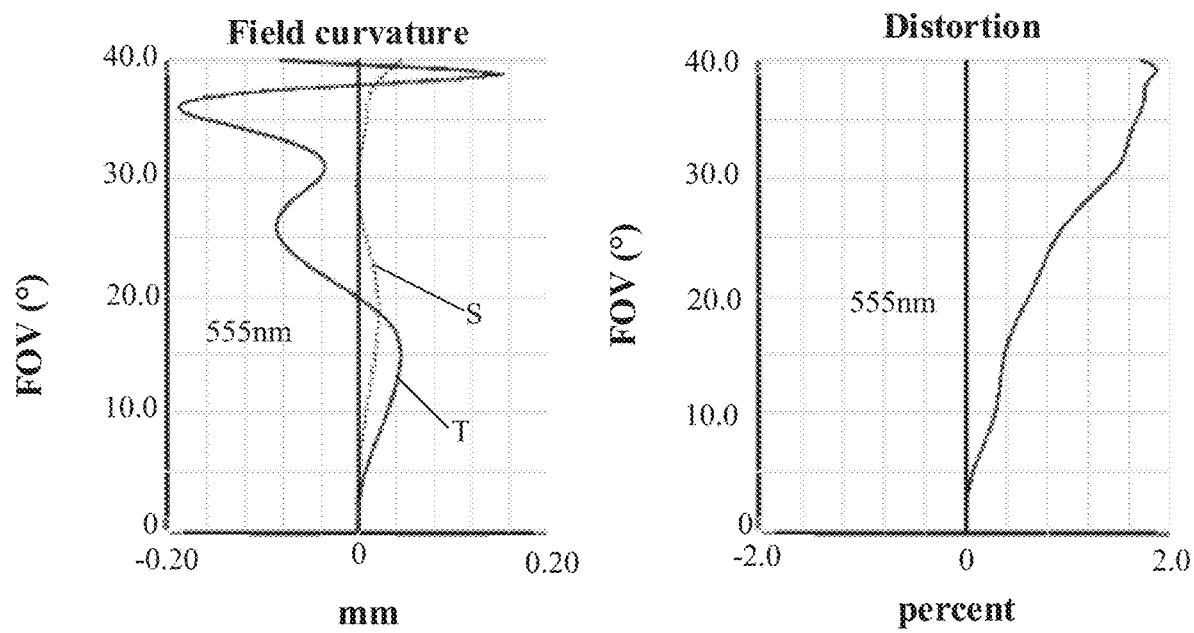
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 650 nm, 610 nm, 555 nm, 510 nm and 470 nm after passing the camera optical lens 40 according to Embodiment 4. FIG. 16 illustrates a field curvature and a distortion of light with a wavelength of 555 nm after passing the camera optical lens 40 according to Embodiment 4. A field curvature S in FIG. 16 is a field curvature in a sagittal direction, and T is a field curvature in a tangential direction.

In an embodiment, an entrance pupil diameter of the camera optical lens 40 is 2.898 mm, an image height of 1.0H is 4.649 mm, a FOV (field of view) in the diagonal direction is 80.00°. Thus, the camera optical lens has a wide-angle and is ultra-thin. Its on-axis and off-axis aberrations are fully corrected, thereby achieving excellent optical characteristics.

Embodiment 5

Figure 17:
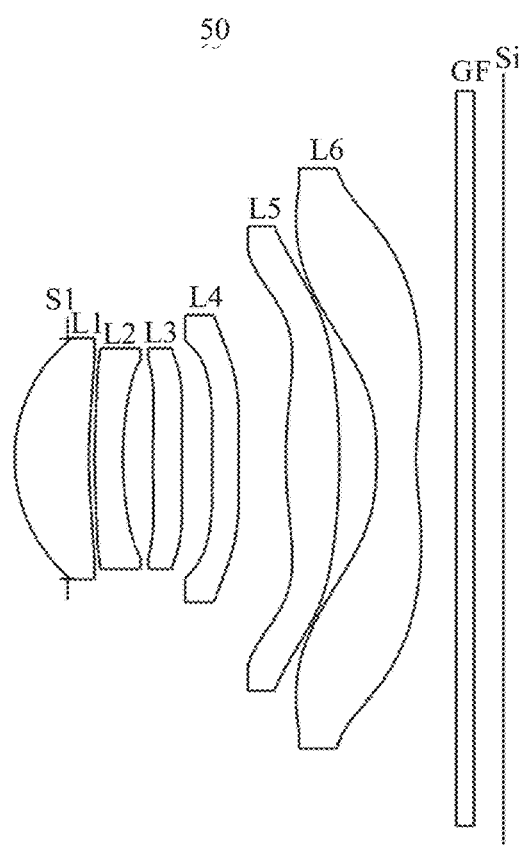
FIG. 17 is a schematic diagram of a structure of a camera optical lens according to Embodiment 5 of the present disclosure.

FIG. 17 is a schematic diagram of a structure of a camera optical lens 50 according to Embodiment 5 of the present disclosure. Embodiment 5 is basically the same as Embodiment 1 and involves symbols having the same meanings as Embodiment 1, and only differences therebetween will be described in the following.

Table 17 and Table 18 show design data of the camera optical lens 50 in Embodiment 5 of the present disclosure.

TABLE 17

| | R | d | | nd | | vd |
|---|---|---|---|---|---|---|
| S1 | ∞ | d0= | −0.643 | | | |
| R1 | 1.872 | d1= | 0.900 | nd1 | 1.5476 | v1 | 53.90 |
| R2 | 4.680 | d2= | 0.070 | | | |
| R3 | 6.067 | d3= | 0.344 | nd2 | 1.6601 | v2 | 19.52 |
| R4 | 4.006 | d4= | 0.372 | | | |
| R5 | 11.566 | d5= | 0.350 | nd3 | 1.5466 | v3 | 54.81 |
| R6 | 16.273 | d6= | 0.367 | | | |
| R7 | 16.143 | d7= | 0.323 | nd4 | 1.6099 | v4 | 22.87 |
| R8 | 12.798 | d8= | 0.573 | | | |
| R9 | 4.873 | d9= | 0.652 | nd5 | 1.5735 | v5 | 30.46 |
| R10 | −6.470 | d10= | 0.451 | | | |
| R11 | −4.556 | d11= | 0.480 | nd6 | 1.5856 | v6 | 32.87 |
| R12 | 2.968 | d12= | 0.496 | | | |
| R13 | ∞ | d13= | 0.210 | ndg | 1.5168 | vg | 64.21 |
| R14 | ∞ | d14= | 0.366 | | | |

TABLE 18

| | Conic coefficient | Aspherical surface coefficients | | | | |
|---|---|---|---|---|---|---|
| | k | A4 | A6 | A8 | A10 | A12 |
| R1 | −3.1038E−01 | −1.4555E−02 | 1.3683E−01 | −4.5772E−01 | 8.7262E−01 | −9.9386E−01 |
| R2 | −2.3685E+01 | −1.4192E−01 | 4.2818E−01 | −1.0185E+00 | 1.6622E+00 | −1.7685E+00 |
| R3 | −4.5675E+01 | −1.4036E−01 | 3.3682E−01 | −7.0729E−01 | 1.2012E+00 | −1.4143E+00 |
| R4 | −1.4343E+00 | −8.2852E−02 | 3.8317E−01 | −1.3235E+00 | 3.3687E+00 | −5.5609E+00 |
| R5 | 4.0547E+01 | −9.6088E−02 | 2.5342E−01 | −9.1983E−01 | 2.1847E+00 | −3.4751E+00 |
| R6 | 8.7260E+01 | −5.9382E−02 | −5.7657E−02 | 3.0514E−01 | −5.7629E−01 | 4.8077E−01 |
| R7 | 5.5572E+01 | −1.2697E−01 | 3.9782E−03 | 2.2358E−01 | −5.1636E−01 | 6.3263E−01 |
| R8 | 1.6123E+01 | −1.3455E−01 | 6.1033E−02 | −2.8589E−02 | 2.8829E−02 | −3.0250E−02 |
| R9 | 1.4482E+00 | −2.9345E−02 | −1.1724E−02 | 1.2326E−02 | −8.0469E−03 | 2.7219E−03 |
| R10 | −4.6872E+00 | 3.4136E−02 | −4.4083E−02 | 3.1298E−02 | −1.4039E−02 | 3.7734E−03 |
| R11 | −1.5418E+00 | −1.4255E−01 | 7.6539E−02 | −2.2503E−02 | 4.4395E−03 | −5.9210E−04 |
| R12 | −2.5317E+01 | −8.0083E−02 | 3.5208E−02 | −9.4380E−03 | 1.4523E−03 | −1.1131E−04 |

| | Aspherical surface coefficients | | | |
|---|---|---|---|---|
| | A14 | A16 | A18 | A20 |
| R1 | 6.9447E−01 | −2.9230E−01 | 6.8117E−02 | −6.7662E−03 |
| R2 | 1.2021E+00 | −5.0308E−01 | 1.1817E−01 | −1.1959E−02 |
| R3 | 1.0882E+00 | −5.2029E−01 | 1.4045E−01 | −1.6408E−02 |
| R4 | 5.8147E+00 | −3.7107E+00 | 1.3188E+00 | −1.9984E−01 |
| R5 | 3.6056E+00 | −2.3317E+00 | 8.4914E−01 | −1.3210E−01 |
| R6 | −1.1364E−01 | −9.4219E−02 | 6.8586E−02 | −1.2854E−02 |
| R7 | −4.7508E−01 | 2.1436E−01 | −5.3112E−02 | 5.5590E−03 |

TABLE 18-continued

| | | | | |
|---|---|---|---|---|
| R8 | 1.8121E−02 | −5.7665E−03 | 9.2332E−04 | −5.8865E−05 |
| R9 | −5.0403E−04 | 5.3144E−05 | −3.0435E−06 | 7.4329E−08 |
| R10 | −6.0743E−04 | 5.7585E−05 | −2.9689E−06 | 6.4268E−08 |
| R11 | 5.1892E−05 | −2.8346E−06 | 8.6815E−08 | −1.1302E−09 |
| R12 | 3.5890E−07 | 6.1085E−07 | −4.1684E−08 | 8.9517E−10 |

Table 19 and Table 20 show design data inflexion points and arrest points of the respective lenses in the camera optical lens 50 according to Embodiment 5 of the present disclosure.

TABLE 19

| | Number(s) of inflexion points | Inflexion point position 1 | Inflexion point position 2 | Inflexion point position 3 |
|---|---|---|---|---|
| P1R1 | 1 | 1.415 | | |
| P1R2 | 1 | 0.975 | | |
| P2R1 | 3 | 0.425 | 0.685 | 1.285 |
| P2R2 | | | | |
| P3R1 | 3 | 0.365 | 1.145 | 1.185 |
| P3R2 | 2 | 0.295 | 1.215 | |
| P4R1 | 1 | 0.205 | | |
| P4R2 | 3 | 0.235 | 1.435 | 1.645 |
| P5R1 | 2 | 0.725 | 2.055 | |
| P5R2 | 1 | 2.255 | | |
| P6R1 | 2 | 1.505 | 3.275 | |
| P6R2 | 3 | 0.475 | 2.975 | 3.475 |

TABLE 20

| | Number of arrest points | Arrest point position 1 |
|---|---|---|
| P1R1 | | |
| P1R2 | 1 | 1.305 |
| P2R1 | | |
| P2R2 | | |
| P3R1 | 1 | 0.625 |
| P3R2 | 1 | 0.515 |
| P4R1 | 1 | 0.365 |
| P4R2 | 1 | 0.405 |
| P5R1 | 1 | 1.215 |
| P5R2 | | |
| P6R1 | 1 | 2.885 |
| P6R2 | 1 | 1.005 |

In addition, Table 21 in the following shows various values of Embodiments 5 and values corresponding to parameters which are specified in the above conditions.

Figure 18:
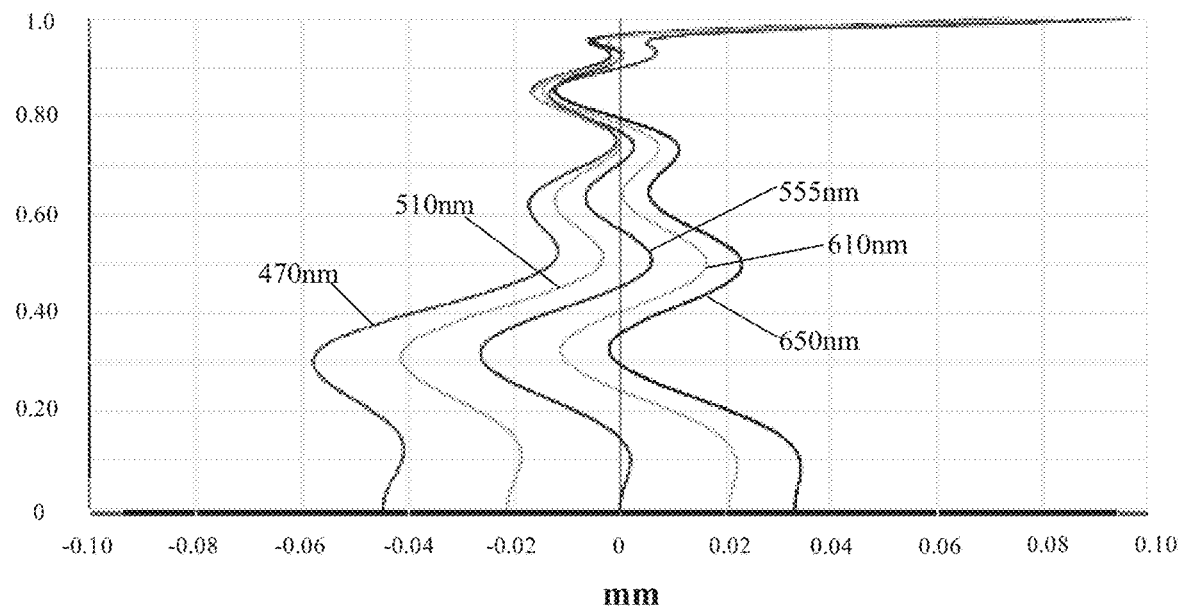
FIG. 18 is a schematic diagram of a longitudinal aberration of the camera optical lens shown in FIG. 17.
Figure 19:
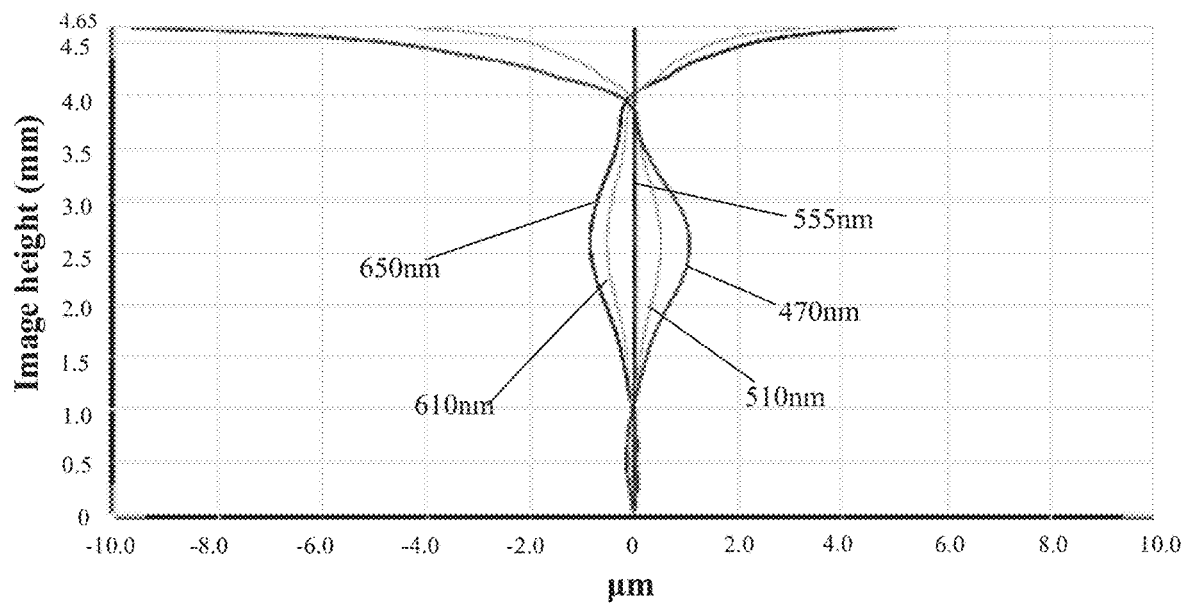
FIG. 19 is a schematic diagram of a lateral color of the camera optical lens shown in FIG. 17.
Figure 20:
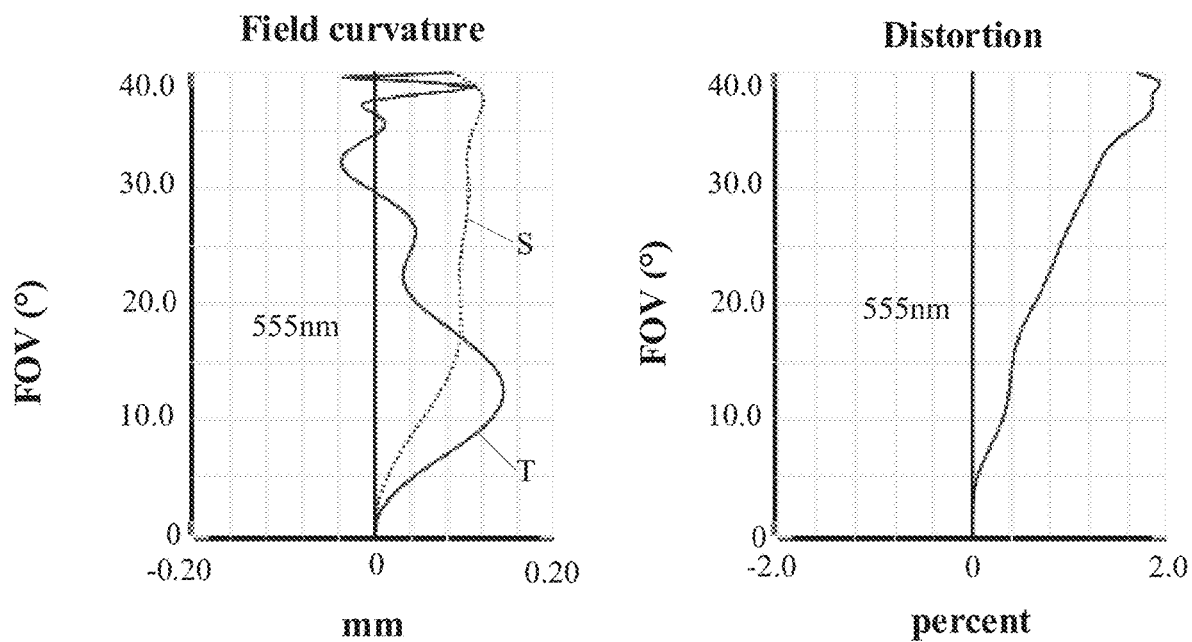
FIG. 20 is a schematic diagram of a field curvature and a distortion of the camera optical lens shown in FIG. 17.

FIG. 18 and FIG. 19 illustrate a longitudinal aberration and a lateral color of light with wavelengths of 650 nm, 610 nm, 555 nm, 510 nm and 470 nm after passing the camera optical lens 50 according to Embodiment 5. FIG. 20 illustrates a field curvature and a distortion of light with a wavelength of 555 nm after passing the camera optical lens 50 according to Embodiment 5. A field curvature S in FIG. 20 is a field curvature in a sagittal direction, and T is a field curvature in a tangential direction.

In this embodiment, an entrance pupil diameter of the camera optical lens 50 is 2.899 mm, an image height of 1.0H is 4.649 mm, a FOV (field of view) in the diagonal direction is 80.00°. Thus, the camera optical lens has a wide-angle and is ultra-thin. Its on-axis and off-axis aberrations are fully corrected, thereby achieving excellent optical characteristics.

Table 21 in the following lists values corresponding to the respective conditions in an embodiment according to the above conditions. Obviously, the embodiment satisfies the above conditions.

TABLE 21

| Parameters and conditions | Embodiment 1 | Embodiment 2 | Embodiment 3 | Embodiment 4 | Embodiment 5 |
|---|---|---|---|---|---|
| f2/f | −1.65 | −1.50 | −1.50 | −3.13 | −3.50 |
| d1/d2 | 8.08 | 7.52 | 6.52 | 13.43 | 12.86 |
| (R9 + R10)/(R9 − R10) | −0.05 | −0.13 | −0.19 | −0.20 | −0.14 |
| R6/f | 3.01 | 3.63 | 10.00 | 3.06 | 3.00 |
| f | 5.420 | 5.422 | 5.424 | 5.420 | 5.421 |
| f1 | 4.166 | 4.173 | 4.165 | 5.089 | 5.100 |
| f2 | −8.924 | −8.134 | −8.141 | −16.970 | −18.971 |
| f3 | 90.980 | 34.250 | 25.882 | 57.510 | 71.044 |
| f4 | −200.672 | −104.720 | −52.868 | −126.092 | −104.323 |
| f5 | 5.375 | 5.747 | 6.025 | 5.502 | 4.922 |
| f6 | −3.533 | −3.790 | −3.796 | −3.468 | −2.982 |
| f12 | 6.422 | 6.771 | 6.691 | 6.414 | 6.257 |
| FNO | 1.90 | 1.90 | 1.90 | 1.87 | 1.87 |

The above are only embodiments of the present disclosure. It shall be indicated that those of ordinary skill in the art can make improvements without departing from the creative concept of the present disclosure, and these belong to the protection scope of the present disclosure.

What is claimed is:
1. A camera optical lens comprising, from an object side to an image side:
   a first lens having a positive refractive power;
   a second lens having a negative refractive power;
   a third lens having a refractive power;
   a fourth lens having a refractive power;
   a fifth lens having a positive refractive power; and
   a sixth lens having a negative refractive power;
   wherein the camera optical lens satisfies following conditions:

$-3.50 \leq f2/f \leq -1.50$;

$6.50 \leq d1/d2 \leq 13.50$;

$-0.20 \leq (R9+R10)/(R9-R10) \leq -0.05$; and $3.00 \leq R6/f \leq 10.00$;

where f denotes a focal length of the camera optical lens;
f2 denotes a focal length of the second lens;
d1 denotes an on-axis thickness of the first lens;
d2 denotes an on-axis distance from an image-side surface of the first lens to an object-side surface of the second lens;
R6 denotes a curvature radius of an image-side surface of the third lens;
R9 denotes a curvature radius of an object-side surface of the fifth lens; and
R10 denotes a curvature radius of an image-side surface of the fifth lens.

2. The camera optical lens according to claim 1 further satisfying the following condition:

$-0.70 \leq f6/f \leq -0.55$;

where
f6 denotes a focal length of the sixth lens.

3. The camera optical lens according to claim 1 further satisfying the following condition:

$2.50 \leq R2/R1 \leq 4.50$;

where
R1 denotes a curvature radius of an object-side surface of the first lens; and
R2 denotes a curvature radius of an image-side surface of the first lens.

4. The camera optical lens according to claim 1 further satisfying the following conditions:

$0.07 \leq d1/TTL \leq 0.23$;

$-4.67 \leq (R1+R2)/(R1-R2) \leq -1.05$; and $0.38 \leq f1/f \leq 1.41$;

where
f1 denotes a focal length of the first lens;
TTL denotes a total optical length from an object-side surface of the first lens to an image surface of the camera optical lens along an optical axis;
R1 denotes a curvature radius of an object-side surface of the first lens; and
R2 denotes a curvature radius of an image-side surface of the first lens.

5. The camera optical lens according to claim 1 further satisfying the following conditions:

$0.02 \leq d3/TTL \leq 0.09$; and $0.76 \leq (R3+R4)/(R3-R4) \leq 7.33$;

where
d3 denotes an on-axis thickness of the second lens;
TTL denotes a total optical length from an object-side surface of the first lens to an image surface of the camera optical lens along an optical axis;
R3 denotes a curvature radius of an object-side surface of the second lens; and
R4 denotes a curvature radius of an image-side surface of the second lens.

6. The camera optical lens according to claim 1 further satisfying the following conditions:

$0.03 \leq d5/TTL \leq 0.11$;

$-15.65 \leq (R5+R6)/(R5-R6) \leq -1.04$; and $2.39 \leq f3/f \leq 25.18$;

where
f3 denotes a focal length of the third lens,
d5 denotes an on-axis thickness of the third lens,
TTL denotes a total optical length from an object-side surface of the first lens to an image surface of the camera optical lens along an optical axis, and
R5 denotes a curvature radius of an object-side surface of the third lens.

7. The camera optical lens according to claim 1 further satisfying the following conditions:

$0.03 \leq d7/TTL \leq 0.08$;

$1.61 \leq (R7+R8)/(R7-R8) \leq 22.33$; and $-74.05 \leq f4/f \leq -6.50$;

where
f4 denotes a focal length of the fourth lens,
d7 denotes an on-axis thickness of the fourth lens,
TTL denotes a total optical length from an object-side surface of the first lens to an image surface of the camera optical lens along an optical axis,
R7 denotes a curvature radius of an object-side surface of the fourth lens, and
R8 denotes a curvature radius of an image-side surface of the fourth lens.

8. The camera optical lens according to claim 1 further satisfying the following conditions:

$0.05 \leq d9/TTL \leq 0.16$; and $0.45 \leq f5/f \leq 1.67$;

where
f5 denotes a focal length of the fifth lens,
d9 denotes an on-axis thickness of the fifth lens, and
TTL denotes a total optical length from an object-side surface of the first lens to an image surface of the camera optical lens along an optical axis.

9. The camera optical lens according to claim 1 further satisfying the following conditions:

$0.04 \leq d11/TTL \leq 0.12$; and $0.11 \leq (R11+R12)/(R11-R12) \leq 0.64$;

where
d11 denotes an on-axis thickness of the sixth lens,
TTL denotes a total optical length from an object-side surface of the first lens to an image surface of the camera optical lens along an optical axis,
R11 denotes a curvature radius of an object-side surface of the sixth lens, and
R12 denotes a curvature radius of an image-side surface of the sixth lens.

10. The camera optical lens according to claim 1 further satisfying the following condition:

$FNO \leq 1.90$;

where
FNO denotes an F number of the camera optical lens.

* * * * *